(12) United States Patent
Kinoshita et al.

(10) Patent No.: US 7,585,076 B2
(45) Date of Patent: Sep. 8, 2009

(54) COOLING UNIT MANUFACTURING METHOD, COOLING UNIT, OPTICAL DEVICE AND PROJECTOR

(75) Inventors: Satoshi Kinoshita, Matsumoto (JP); Makoto Zakoji, Shiojiri (JP); Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 546 days.

(21) Appl. No.: 11/335,527

(22) Filed: Jan. 20, 2006

(65) Prior Publication Data

US 2006/0198150 A1   Sep. 7, 2006

(30) Foreign Application Priority Data

Mar. 1, 2005   (JP)   ............... 2005-055630

(51) Int. Cl.
  *G03B 21/16*   (2006.01)
  *G03B 21/18*   (2006.01)
  *G03B 21/26*   (2006.01)
  *H04N 5/74*   (2006.01)

(52) U.S. Cl. ............................ 353/52; 353/54; 348/748; 348/749

(58) Field of Classification Search ............ 29/890.035, 29/890.038, 890.039, 890.04, 525.13; 353/52, 353/54; 349/72, 161; 361/702, 709, 711, 361/699; 372/35; 348/749; 165/168, 80.4, 165/170
See application file for complete search history.

(56) References Cited

U.S. PATENT DOCUMENTS

| | | | | |
|---|---|---|---|---|
| 3,448,798 A | * | 6/1969 | Coe | ............................ 165/168 |
| 5,170,195 A | * | 12/1992 | Akiyama et al. | ............... 353/54 |
| 5,562,146 A | * | 10/1996 | Harmon et al. | ............. 164/112 |
| 5,829,516 A | * | 11/1998 | Lavochkin | ................. 165/80.4 |
| 2005/0268407 A1 | * | 12/2005 | Abrams | .......................... 8/539 |
| 2006/0196050 A1 | * | 9/2006 | Fujimori et al. | ........ 29/890.035 |
| 2006/0197919 A1 | * | 9/2006 | Fujimori et al. | ............... 353/61 |

FOREIGN PATENT DOCUMENTS

| | | | |
|---|---|---|---|
| JP | 02078158 A | * | 3/1990 |
| JP | A-08-205466 | | 8/1996 |
| JP | 09271863 A | * | 10/1997 |
| JP | A 2002-156195 | | 5/2002 |

OTHER PUBLICATIONS

English Publication of Abstract, JP 02078158 A, Ouchi et al., Mar. 19, 1990.*

* cited by examiner

*Primary Examiner*—William C Dowling
*Assistant Examiner*—Ryan Howard
(74) *Attorney, Agent, or Firm*—Oliff & Berridge, PLC

(57) ABSTRACT

A method of manufacturing a cooling unit having a cooling plate in which a cooling fluid is allowed to flow, the cooling plate has a structure that a pair of plate members are oppositely arranged sandwiching a cooling tube the cooling fluid is to flow is disclosed. The method includes: forming a groove for receiving the cooling tube, in at least one pair of plate members; and joining each of the one pair of plate members and the cooling tube together by receiving the cooling tube in the groove; wherein, in joining, an external force is applied to at least one of the one pair of plate members whereby deformation is caused in an adjacent point to the groove thereby engaging the adjacent point with the cooling tube.

19 Claims, 19 Drawing Sheets

COOLING UNIT MANUFACTURING METHOD, COOLING UNIT, OPTICAL DEVICE AND PROJECTOR

BACKGROUND

1. Technical Field

The present invention relates to a cooling unit manufacturing method, cooling unit, optical device and projector.

2. Related Art

The cooling units using cooling fluid include those having a cooling plate in a structure arranged with a metal pipe as a cooling-liquid passageway between the inner surfaces of a pair of metal plates assembled oppositely. This cooling plate is manufactured by forming a pipe receiving groove greater than the metal pipe in at least one of the one pair of metal plates and assembling the metal pipe and the one pair of metal plates integrally. During the manufacturing process, a pressurized fluid is supplied in the metal pipe after the assembling. By expanding the diameter of the pipe, the metal pipe is closely contacted with the pipe-receiving groove (see JP-A-2002-156195, for example).

In the cooling unit manufacturing method, the pipe-receiving groove is formed inverted taper with respect to the mating surface. During expanding the diameter of the metal pipe, the groove edge (undercut) is bitten in the metal pipe thereby joining the metal plate and the metal pipe together.

However, in the manufacturing method, there is a need for conducting a machining with the use of an especial cutting tool in forming the undercut, making it difficult to reduce the cost.

Meanwhile, in order to place the metal pipe in good contact with the receiving groove, the process of metal pipe diameter expansion must be divided and repeated a plurality of number of times. This however requires a long time.

Furthermore, where the metal pipe is small in diameter, the pipe is difficult to expand the diameter thereof. Moreover, uneven deformation is ready to occur on the pipe, a gap is possibly caused between the pipe and the receiving groove. As a result, the cooling capability is likely to lower in the cooling plate.

SUMMARY

An object of some aspects of the invention is to provide a method of manufacturing a cooling unit that is suited for cost and size reduction, cooling unit, optical device and projector.

According to an aspect of the invention, there is provided a method of manufacturing a cooling unit having a cooling plate in which a cooling fluid is allowed to flow, wherein the cooling plate has a structure that a pair of plate members are oppositely arranged sandwiching a cooling tube through which the cooling fluid is to flow. The method comprises forming a groove for receiving the cooling tube, in at least one opposing surface of the one pair of plate members, and joining each of the one pair of plate members and the cooling tube together by receiving the cooling tube in the groove. In joining, an external force is applied to at least one of the one pair of plate members whereby deformation is caused in an adjacent point to the groove thereby engaging the adjacent point with the cooling tube.

In this method, because the one pair of plate members and the cooling tubes are joined together by applying an external force to at least one of the one pair of plate members, manufacturing time can be shortened greatly as compared to the expansion in diameter of the cooling tube. Moreover, by eliminating the need for a diameter expanding process, application is possible suitably for a cooling tube small in diameter.

Accordingly, the manufacturing method is suitably applied for cost and size reduction.

Incidentally, in a cooling unit manufactured by the above manufacturing method, contact is provided between the groove in the plate member and the cooling tube thereby providing thermal connection between the both. A to-be-cooled object contacted with the plate member is removed of heat by the cooling fluid flowing in the cooling tube. In the structure the cooling tube is arranged in the cooling plate, because a reduced number of junctions is required for forming a cooling-fluid passageway, there is a reduced risk of fluid leak. Meanwhile, piping resistance is small because of forming a passageway uniform and smooth with respect to the flow direction.

In the manufacturing method, the groove can be formed by use of casting or forging in groove forming. With forging or casting, cost reduction due to mass production is easy to achieve as compared to forming a groove using machining.

Meanwhile, by providing a structure that the groove and the cooling tube have contours substantially equal in size, the groove and the cooling tube are contacted with each other thus improving the heat transfer characteristic between the plate member and the cooling tube.

In the manufacturing method, a concave adjacent to the groove is formed in addition to groove in at least one opposing surface of the one pair of plate members in groove forming for example while, in joining, a bank between the groove and the concave is depressed inward of the groove thereby causing a deformation in the bank and engaging a corner of the bank with the cooling tube.

Due to this, because the concave is formed adjacent to the groove, it is easy to deform the bank between the groove and the concave.

In this case, a convex to be inserted in the concave is further formed in at least one opposing surface of the one pair of plate members in groove forming while, in joining, mating is provided between the concave in one plate member and the convex in the other plate member, whereby the bank can be deformed.

Due to this, by mating the one pair of plate members together, the one pair of plate members can be each engaged with the cooling tube, thus simplifying the process.

Meanwhile, for example, in joining, the groove is partially deformed by inserting a predetermined object in at least one of the one pair of plate members.

In this case, the predetermined object, in place of the deformed point, may be engaged with each of the cooling tubes.

Due to this, by using a predetermined object different from the plate member, engagement is possible between each of the one pair of plating members and the cooling tube.

The manufacturing method can further comprise filling a heat conductive material in a gap between the groove and the cooling tube.

Due to this, by filling a heat conductive material, heat transfer characteristic can be improved between the plate members and the cooling tube.

The heat conductive material preferably has a heat conductivity of 3 W/(m·K) or greater, more preferably 5 W/(m·K) or greater. In case the heat conductivity of the heat conductive material is smaller than 3 W/(m·K), the heat of the plate member is not easy to move to the cooling tube, which is not preferred. Meanwhile, in case the heat conductivity of the heat conductive material is 5 W/(m·K) or greater, the heat of the plate member is to favorably move to the cooling tube.

In this case, for example, the heat conductive material preferably includes at least one of a resin material mixed with a metal material, a resin material mixed with a carbon material, and a hot melt.

Meanwhile, the heat conductive material preferably has an elasticity in a temperature range for using the cooling plate.

By the elasticity caused by the heat conductive material, the heat conductive material expands and contracts according to a change in the gap between the plate members and the cooling tube due to thermal deformation, stably maintaining the thermal connection between the plate members and the cooling tube.

According to another aspect of the invention, a cooling unit is manufactured by the manufacturing method. The cooling unit can be reduced in cost and size.

According to still another aspect of the invention, there is provided an optical device including a light modulation element for modulating a luminous flux emitted from a light source according to image information and forming an optical image. At least, the light modulation element is held in a cooling unit manufactured by a method according to those in the above.

With the optical device, achieved are size and cost reduction and cooling efficiency improvement.

According to further aspect of the invention, there is provided a projector comprising a light source device, at least an optical device in which a light modulation element for modulating a luminous flux emitted from the light source device in response to image information to form an optical image is held in the cooling unit manufactured by the above method and a projection optical device for projecting, with magnification, an optical image formed by the optical device.

With the projector, achieved are size and cost reduction and cooling efficiency improvement.

BRIEF DESCRIPTION OF THE DRAWINGS

The invention will be described with reference to the accompanying drawings, wherein like numbers reference like elements.

FIG. 1A is a plan view showing a structure of a cooling unit while

FIG. 16A is an assembly front view of the liquid-crystal-panel holder frame while

FIG. 17A is an assembly front view of an incident-side-polarizer holder frame while

FIG. 18A is an assembly front view of an exit-side-polarizer holder frame while

DESCRIPTION OF THE EXEMPLARY EMBODIMENTS

Embodiments of the present invention will now be described with reference to the drawings. Note that, in the figures, the structural elements are shown different in their reduction scales, as required, from those in the actual, in order to depict those in sizes that can be readily recognized in the figure.

Cooling Unit

Figure 1A:
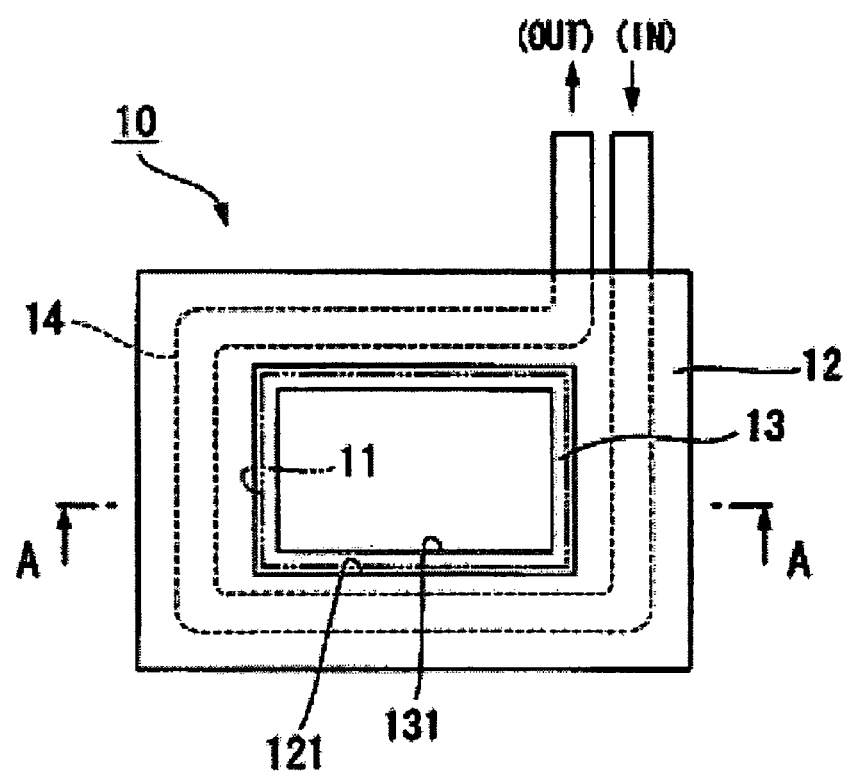
Figure 1B:
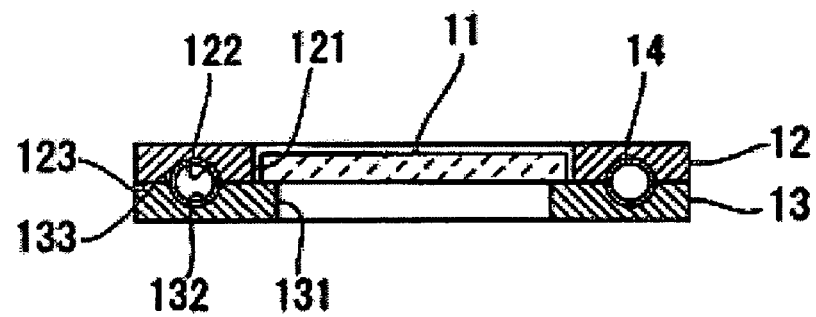
FIG. 1B is a cross-sectional view on line A-A shown in FIG. 1A.

FIG. 1A is a plan view showing a structure of a cooling unit 10 while FIG. 1B is a cross-sectional view on line A-A in FIG. 1A.

As shown in FIGS. 1A and 1B, the cooling unit 10 is to hold the peripheral edge of a transmission optical element 11 and cool the optical element 11. This has a pair of plate members 12, 13 holding the optical element 11 and a cooling tube 14 clamped by the pair of plate members 12, 13.

For the optical element 11, various optical elements are applicable including a retardation film and a viewing-angle corrector besides a liquid-crystal panel and a polarizer plate. Meanwhile, the invention is also applicable to the reflective optical device without limited to the transmission type. Furthermore, the invention is applicable in cooling other objects without limited to the optical element. Incidentally, description will be made in detail later on the example that the cooling unit of the invention is applied to a cooling structure for a liquid-crystal panel and polarizer plate.

The plate members 12, 13 are respectively frames generally rectangular in plan, each of which has a rectangular aperture 121, 131 corresponding to a luminous-flux transmission area of the optical element 11, and a groove 122, 132 for receiving the cooling tube 14. The plate member 12 and the plate member 13 are arranged opposite to each other sandwiching the cooling tube 14 between those. The plate members 12, 13 preferably use a well conductor of heat formed of a material having a high heat conductivity, e.g. various metals are applicable besides aluminum (234 W/(m·K)), magnesium (156 W/(m·K)) or its alloy (aluminum alloy (approximately 100 W/(m·K)), hypobaric magnesium alloy (approximately 50 W/(m·K)). Meanwhile, the plate member 12, 13 may be another material (resin material or the like) having a high heat conductivity (e.g. 5 W/(m·K) or higher) without limited to the metal material.

The cooling tube 14 is formed by a pipe or tube having, for example, an annular cross-section and extending along the axis thereof, and bent conforming to the plan form of the groove 122, 132 in the plate member 12, 13. The cooling tube 14 preferably uses a well conductor of heat formed of a material having a high heat conductivity, e.g. various metals are applicable besides aluminum (234 W/(m·K)), copper (398 W/(m·K)), stainless steel (16 W/(m·K)(austenitic)) or its alloy. Meanwhile, the cooling tube 14 may be other material (resin material or the like) having a high heat conductivity (e.g. 5 W/(m·K) or higher) without limited to the metal material.

Specifically, the cooling tube 14 is arranged extending nearly over a round along the peripheral edge of the optical element 11, in a position outer than the peripheral edge of the optical element 11 as shown in FIGS. 1A and 1B. Namely, in the opposing surfaces 123, 133 (inner surfaces, mating surfaces) of the plate members 12, 13, grooves 122, 232 generally semicircular in cross-section are respectively formed nearly over a round along the edges of the apertures 121, 131. The groove 122 and the groove 132 are generally in a relationship of mirror symmetry in form with each other. In a state the cooling tube 14 is received in the grooves 122, 123, the plate members 12, 13 are joined together. In this embodiment, the cooling tube 14 is a circular pipe having an outer diameter nearly equal to the thickness of the optical element 11.

Figure 2:
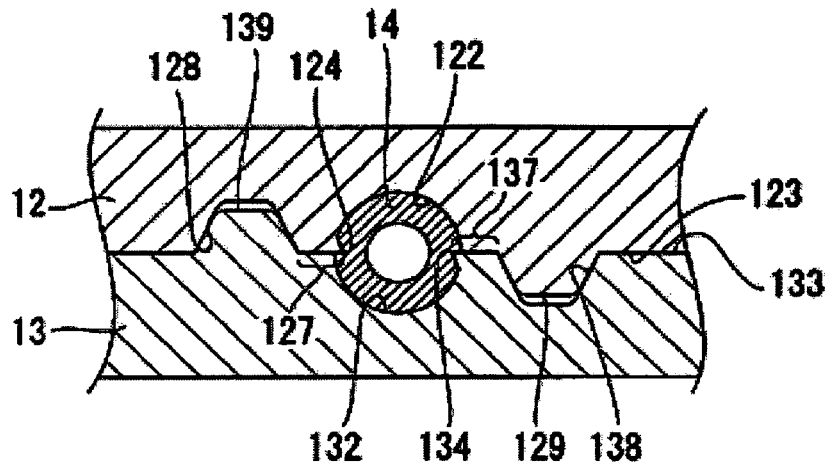
FIG. 2 is a partial cross-sectional view showing, with magnification, a groove in a plate member.

FIG. 2 is a partial cross-sectional view showing around the grooves 122, 132 of the plate members 12, 13, in a magnified form. As shown in FIG. 2, the inner surface of the grooves 122, 132 and the outer surface of the cooling tube 14 have respective contours nearly equal in size, both of which are in contact with each other. Meanwhile, the plate members 12, 13 respectively have projections 124, 134 protruding inward of the grooves 122, 132. The projections 124, 134 bite the outer surface of the cooling tube 14 into engagement therewith, thereby integrating the plate members 12, 13 and the cooling tube 14 together.

Furthermore, in each of the opposite surfaces 123, 133 of the plate members 12, 13, there are formed a concave 128, 138 adjacent to the groove 122, 132 and a convex 129, 139 to be inserted in the concave 128, 133 of the opposite member. The concave 128, 138 is formed recessed from the opposite surface 123, 133 while the convex 129, 139 is formed protruding from the opposite surface 123, 133. The concave 128, 138 and the convex 129, 139 serve as a positioning guide in joining the plate member 12 and the plate member 13 together.

Between the groove 122, 132 and the concave 128, 138, a bank 127, 137 is formed having a side surface provided by a wall surface of the groove 122, 132 and a wall surface of the concave 128, 138. In this embodiment, the projection 124, 134 to be engaged with the cooling tube 14 is given as an edge of the groove 122, 132 which is a corner of the bank 127, 137. The corner of the bank 127, 137 is preferably sharp in form. The concave 128, 138, the convex 129, 139 and the bank 127, 137 may be formed continuous along the groove 122, 132 or formed intermittently or partially.

Incidentally, in this embodiment, in the concave 128 (138) of one plate member 12 (13) is inserted the convex 139 (129) of the other plate member 13 (12), as referred later. Due to this, the bank 127 (137) is deformed into biting at its corner projection 124, 134 in the outer surface of the cooling tube 14. Accordingly, close contact is provided between the wall surface of the concave 128, 138 and the wall surface of the convex 129, 139.

Referring back to FIG. 1, the cooling tube 14 has one end arranged with an inlet (IN) for a cooling fluid and the other end with an outlet (OUT). The inlet and the outlet of the cooling tube 14 are respectively connected with pipes for circulating the cooling fluid. Incidentally, on a cooling fluid passageway, there are arranged fluid-circulating devices including a fluid feeder, various tanks and a radiator, respectively not shown.

The cooling fluid, entered the cooling tube 14 through the inlet (IN), flows nearly one round along the peripheral edge of the optical element 11, to exit at the outlet (OUT). Meanwhile, the cooling fluid deprives heat from the optical element 11 while flowing in the cooling tube 14. Namely, the heat of the optical element 11 is transferred to the cooling fluid in the cooling tube 14 through the plate member 12, 13, then conveyed to the outside.

In this embodiment, in the plate members 12, 13, contact is provided between the inner surface of the groove 122, 132 and the outer surface of the cooling tube 14. In addition, part of the plate member 12, 13 (projection 124, 134) bites the outer surface of the cooling tube 14 into engagement therewith. This provides thermal connection between the plate members 12, 13 and the cooling tube 14. Meanwhile, the cooling tube 14 is arranged nearly a round along the peripheral edge of the optical element 11, thus having an increased area of heat transfer. Therefore, the optical element 11 is efficiently cooled by the cooling fluid flowing in the cooling tube 14.

The structure that the cooling tube 14 is arranged in the frame (plate members 12, 13) holding the optical element 11, requires comparatively the reduced number of joints for forming a fluid flow passageway, hence reducing the risk of fluid leak. In addition, because of forming a flow passageway uniform and smooth with respect to a flow direction, piping resistance is rendered low. Particularly, in this embodiment, flow disturbance is less because the cooling tube 14 is held generally circular in its cross-section. Moreover, in this structure, the frame serves as both holding means and cooling means for the optical element 11, resultingly providing a merit that it is easy to size-reduce the device having the optical element 11 and to promote the efficiency in cooling the optical element 11. As a result, energy saving can be realized for the fluid feeder.

Incidentally, by filling a heat conductive material in a gap between the groove 122, 132 and the cooling tube 14 in the plate members 12, 13, heat transfer characteristic can be improved between the plate members 12, 13 and the cooling tube 14. Filling such a heat conductive material will be described later.

Cooling Unit Manufacturing Method

Next, explanation will be made to the method for manufacturing the cooling unit 10.

FIG. 3 is an explanatory view showing an example of a method for manufacturing a cooling unit 10. This manufacturing method includes a groove forming process and a joining process.

Figure 3A:
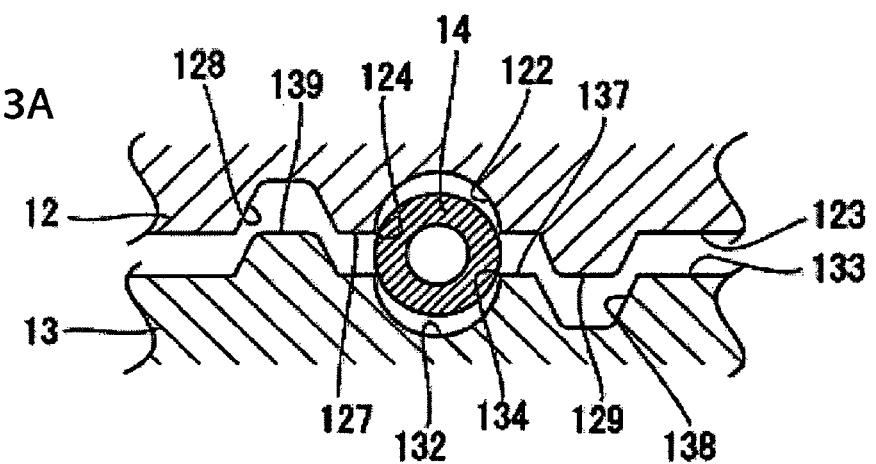
FIGS. 3A and 3B are explanatory views showing an example of a manufacturing method for a cooling unit.

At first, in the groove forming process, formed are a groove 122, 132 generally semicircular or U-form in cross-section for receiving the cooling tube and a concave 128, 138 and convex 129, 139 adjacent to the groove as shown in FIG. 3A, in each of the opposing surfaces 123, 133 of a pair of plate members 12, 13. This process is to integrally form a plate member 12 (13) having a groove 122 (132), a concave 128 (138) and a convex 129 (139) by using casting (die-casting) or forging (cold/hot forging). The form of the groove 122, 132, concave 128, 138 and convex 129, 139 is suitably established according to the material, form, etc. of the plate member 12, 13 and cooling tube 14. For example, the concave 128 (138) and the convex 139 (129) are formed having substantially the same contour (trapezoid in cross-section) for mating with each other wherein the convex 139 (129) is partially slightly greater in width as compared with the concave 128 (138). Meanwhile, the groove 122, 132 and the cooling tube 14 have substantially the same contour (trapezoid in cross-section) for mating with each other. Because the grooves 122, 132 are to be deformed by joining the plate members 12, 13 together referred later, a difference may be provided to between the width of the groove 122, 132 and the diameter of the cooling tube 14 so that close contact is obtained between the groove 122, 132 and the cooling tube 14 after the joining. The use of casting (e.g. die-casting) or forging (e.g. cold/hot forging) makes it possible to easily form those at low cost even in case the plate members 12, 13 are in such forms. Meanwhile, suitable application is possible for a small-sized object.

Figure 3B:
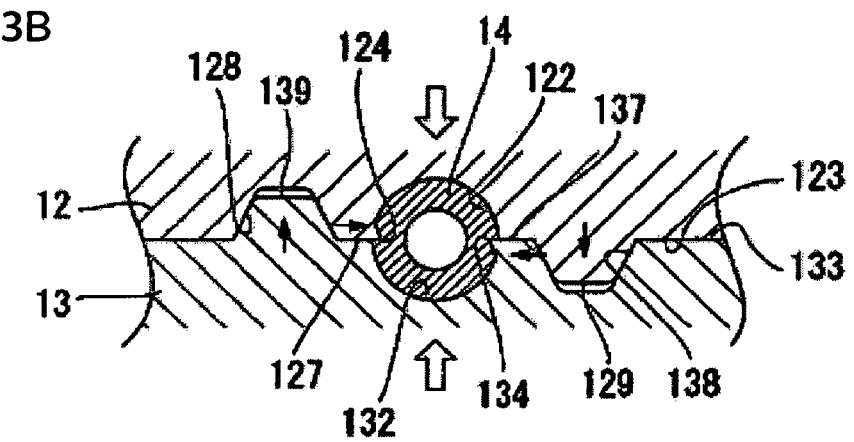

Next, in the joining process, the plate member 12 and the plate member 13 are placed oppositely to receive the cooling tube 14 in the grooves 122, 133, as shown in FIG. 3B. On this occasion, by mating the concave 128 (138) and the convex 139 (129) together, the plate member 12 and the plate member 13 are aligned in planar relative position. Furthermore, in a state the cooling tube 14 is received in the grooves 122, 132, an external force is applied to provide a close contact between the opposite surfaces 123, 133 of the plate members 12, 13. In an insertion process of convex 139 (129) in the concave 128 (138), the bank 127 (137) between the concave 139 (129) and the groove 122 (132) is pushed and deformed by the convex 139 (129). Namely, by mating the concave 128 (138) of the one plate member 12 (13) with the convex 139 (129) of other plate member 13 (12), the bank 127 (137) is depressed inward of the groove 122 (132) so that the bank 127 (137) is deformed inward of the groove 122 (132). In this embodiment, by forming the concave 128, 138 adjacent to the groove 122, 132, the bank 127, 137 is readily deformed which lies between the groove 122, 132 and the concave 128, 138.

As shown in FIG. 3B, by the bank 127, 137 deformation, close contact is achieved between the inner surface of the groove 122, 132 and the outer surface of the cooling tube 14, thus providing a thermal connection between each of the plate members 12, 13 in one pair and the cooling tube 14. Furthermore, by deforming the bank 127, 137, the bank 127, 137 corner (projection 124, 134) adjacent the groove 122, 132 goes into a biting in the outer surface of the cooling tube 14 into an engagement therewith thereby joining the plate members 12, 13 and the cooling tube 14 together. Although the cooling tube 14 contracts in volume due to biting of the projection 124, 134 in the cooling tube 14, the cooling tube 14 is opened at its both ends where the internal air is released, thus eliminating the possibility that extra stresses remain on the cooling tube. This allows for manufacturing a cooling structure (cooling plate) having a structure the one pair of plate members 12, 13 are oppositely arranged sandwiching the cooling tube 14 between them.

Thereafter, an optical element 11 is fixed in the plate members 12, 13 and the cooling tube 14 is connected to a cooling-fluid supply system, thereby completing a cooling unit 10.

In the manufacturing method for a cooling unit 10 in this embodiment, the one pair of plate members 12, 13 and the cooling tube 14 are joined by applying an external force to the plate members 12, 13 as described above. It is therefore possible to greatly reduce the manufacturing time as compared to that of the case joining is by expanding the cooling tube diameter. Meanwhile, in this manufacturing method, process simplification is achieved because joining is due to mating the plate members 12, 13. Moreover, eliminating the diameter-expansion process allows for suitable application to a smaller diameter of cooling tube 14. Therefore, the present manufacturing method can reduce the cost and size of the cooling unit 10 to be manufactured.

FIGS. 4 to 7 are explanatory views showing a modification to the manufacturing method of FIG. 3. Note that the structural element having the same function as that already explained is attached with the same reference, to omit or simplify the explanation thereof.

Figure 4A:
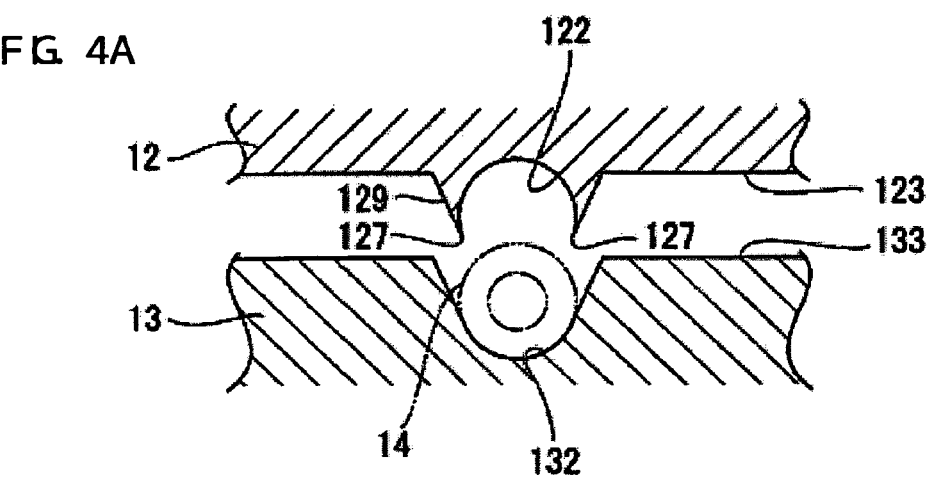
FIGS. 4A and 4B are explanatory views showing a modification of a manufacturing method for a cooling unit.
Figure 4B:
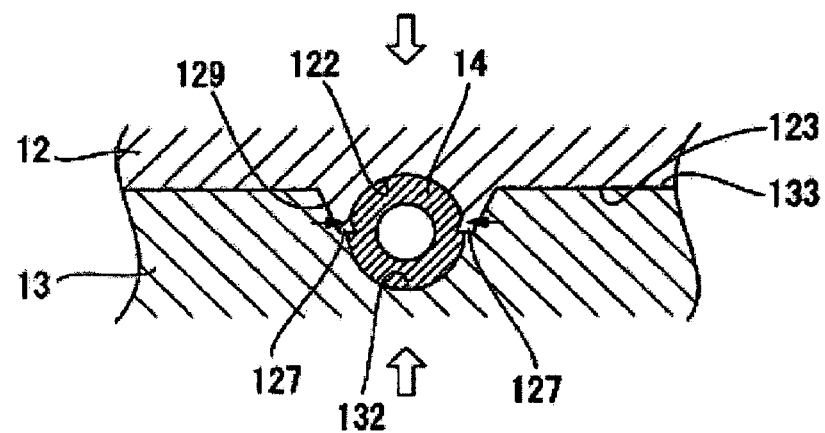

In a FIG. 4 embodiment, the cooling tube 14 is arranged closely to one plate member 13.

Namely, in the groove forming process, a groove 132 capable of receiving the entire cooling tube 14 is formed in the opposing surface 133 of one plate member 13 (FIG. 4A). The groove 132 is provided such that its width increases as the opening is neared from its bottom. Meanwhile, in the opposing surface 12 of the other plate member 123, a convex 129 is formed that is to be inserted in the groove 132 of the plate member 13. The convex 129 is formed protruding from the opposing surface 123 of the plate member 13, thus having, at a center, a groove 122 having a contour nearly equal in size to the cooling tube 14 and a bank 127 adjacent the groove 122. The groove 132 and the convex 129 are suitably established in form depending upon the material, shape, etc. of the plate members 12, 13 and cooling tube 14. By using casting (e.g. die-casting) and forging (e.g. cold/hot forging), the plate members 12, 13 even in such a form can be easily formed at low cost.

In the bonding process, in a state the plate members 12, 13 are oppositely arranged and the cooling tube 14 is received in the groove 132 of one plate member 13, an external force is applied in a manner placing the plate member 12 and the plate member 13 in a close contact. Thereupon, the bank 127 of the other plate member 12 is inserted in a gap between the groove 132 of the one plate member 13 and the cooling tube 14. In the insertion process, the bank 127 is deformed. Namely, by mating the groove of the one plate member 13 with the convex 129 (bank 127) of the other plate member 12, the bank 127 is depressed inward of the groove 122 so that the bank 127 is deformed inward of the groove 122. By deforming the bank 127, close contact is provided between the inner surface of the grooves 122, 132 and the outer surface of the cooling tube 14. This provides a thermal connection between each of the one pair of plate members 12, 13 and the cooling tube 14. Furthermore, by deforming the bank 127, a corner of bank 127, 137 adjacent to the groove 122, 132 bites the outer surface of the cooling tube 14 into engagement therewith. Simultaneously, the convex 129 and the groove 132 are placed into engagement to thereby join the plate members 12, 13 and the cooling tube 14 together.

In this embodiment, structural freedom can be enhanced because of arranging the cooling tube 14 closely to the one plate member 13. Meanwhile, when filling a heat conductive material, the heat conductive material is easy to arrange.

In a FIG. 5 embodiment, the cooling tube 14 is arranged closely to one plate member 13 wherein the cooling tube 14 is generally semicircular in cross-section.

Figure 5A:
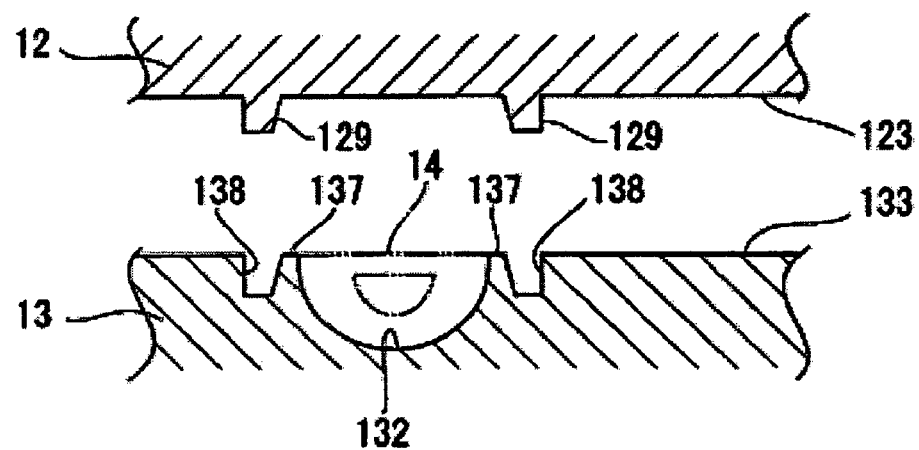
FIGS. 5A and 5B are explanatory views showing a modification of a manufacturing method for a cooling unit.

Namely, in the groove forming process, formed are a groove 132 capable of receiving the entire cooling tube 14 and generally semicircular in cross-section and a concave 138 adjacent the groove, in the opposing surface 133 of one plate member 13. In the opposing surface 123 of the other plate member 12, formed are a mating convex 129 to be inserted in the concave 138 (FIG. 5A). In this process, casting (e.g. die-casting) or forging (e.g. cold/hot forging) is used to integrally form a plate member 12 (13) having a groove 132 and a convex 129 (concave 138). The groove 132, the concave 138 and the convex 129 are suitably established in form depending upon the material, shape, etc. of the plate member 12, 13 and the cooling tube 14. For example, the groove 132 has a contour (semicircular in cross-section) nearly the same as a curved portion of the cooling tube 14. Meanwhile, the concave 138 and the convex 129 have contours (trapezoid in cross-section) nearly the same in form to enable mating with each other wherein the convex 129 is formed slightly greater partially in width than the concave 138. By using casting (e.g. die-casting) and forging (e.g. cold/hot forging), the plate members 12, 13 even in such a form can be easily formed at low cost. Meanwhile, suitable application is possible for a small-sized object.

Figure 5B:
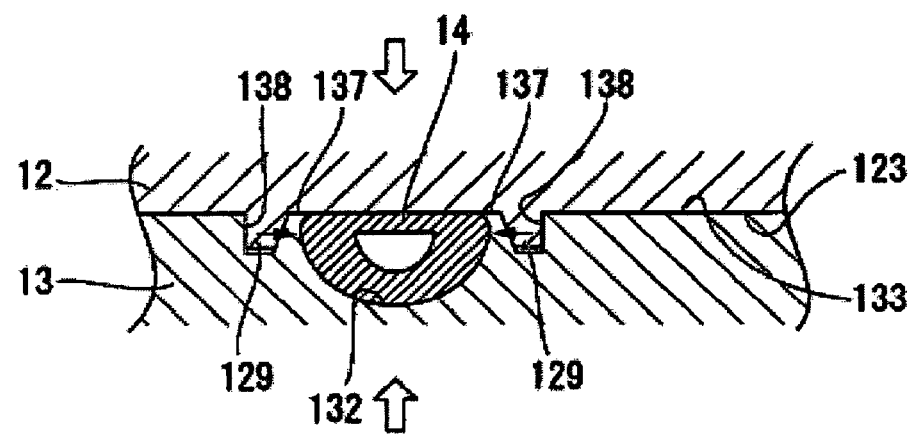

In the bonding process, in a state the plate members 12, 13 are oppositely arranged and the cooling tube 14 is received in the groove 132 of one plate member 13, in case an external force is applied in a manner placing the plate member 12 and the plate member 13 in a close contact, the bank 137 between the concave 138 and the groove 132 is depressed against the convex 129 into deformation in the course the convex 129 is inserted in the concave 138 (FIG. 5B). Namely, by mating the concave 138 of the one plate member 13 with the convex 129 of the other plate member 12, the bank 137 is depressed inward of the groove 132 so that the bank 137 is deformed inward of the groove 132. By placing the opposing surface 123 of the plate member 12 and the planar surface of the cooling tube 14 into close contact as well as placing the inner surface of the groove 132 and the outer surface of the cooling tube 14 into close contact due to deformation of the bank 137, a thermal connection is provided between the one pair of plate members 12, 13 and the cooling tube 14. Furthermore, by deforming the bank 137, a corner of bank 137 adjacent to the groove 132 bites the outer surface of the cooling tube 14 into engagement therewith. Simultaneously, the concave 138 and the convex 129 are placed into engagement to thereby join the plate members 12, 13 and the cooling tube 14 together.

In this embodiment, structural freedom can be enhanced because of arranging the cooling tube 14 closely to the one plate member 13. Meanwhile, when filling a heat conductive material, the heat conductive material is easy to arrange. Furthermore, the generally semicircular form possessed by the cooling tube 14 simplifies the opposing surface 123 of the plate member 12, making it possible to easily form the plate member 12 even by such machining as milling.

In a FIG. 6 embodiment, a pair of plate members 12, 13 and the cooling tube 14 are joined together by inserting jigs 145, 146 respectively in the plate members 12, 13.

Figure 6A:
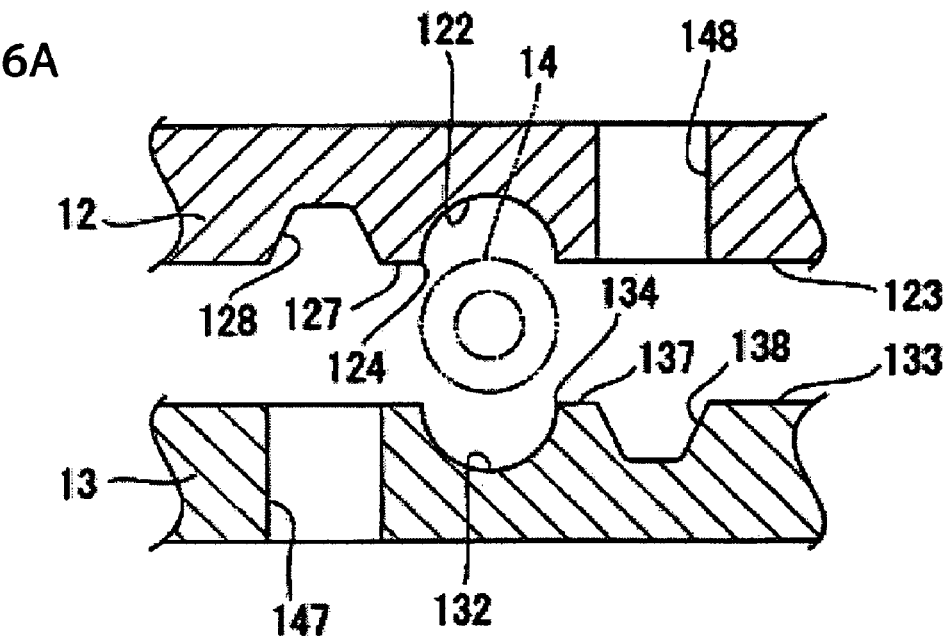
FIGS. 6A and 6B are explanatory views showing a modification of a manufacturing method for a cooling unit.

Namely, in the groove forming process, holes 147, 148 for jig insertion are formed in place of the FIG. 3 convexes 139 (129) besides the grooves 122, 132 and concaves 128, 138 (FIG. 6A). The hole 147 (148) is provided in a position corresponding to the concave 128 (138) of the opposite plate member 12 (13). The use of casting (e.g. die-casting) or forging (e.g. cold/hot forging) makes it possible to easily form the plate members 12, 13 even in such a form at low cost. Meanwhile, suitable application is possible for a small-sized object.

Figure 6B:
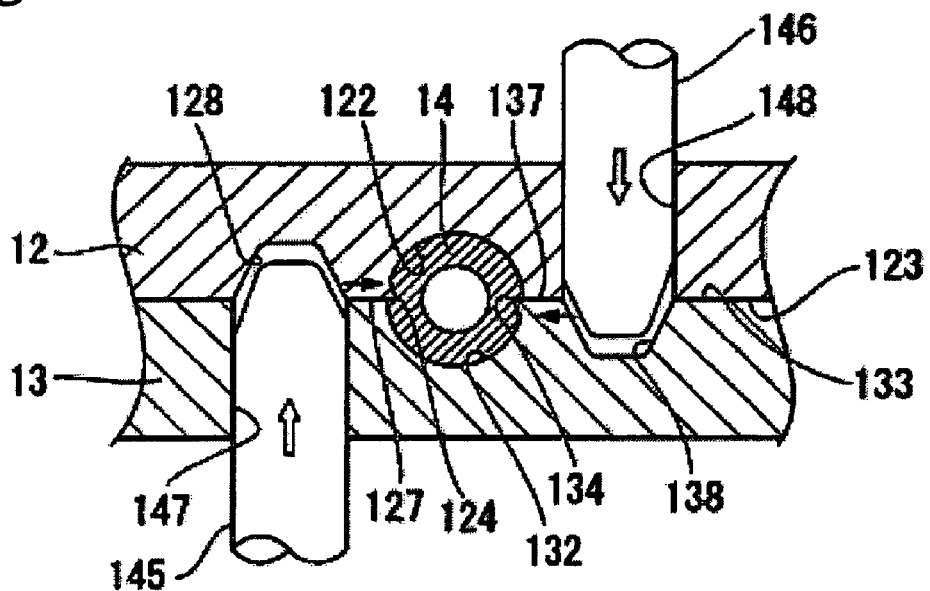

In the joining process, in a state the cooling tube 14 is received in the grooves 122, 132, jigs 145, 146 are inserted in the holes 147, 148 of the plate members 12, 13. The bank 127, 137, a region adjacent to the groove 122, 132, is depressed inward of the groove 122, 132 by a tip of the jig 145, 146. This deforms the bank 127 (137) inward of the groove (FIG. 6B). By deforming the bank 127, 137, close contact is provided between the inner surface of the groove 122, 132 and the cooling tube 14. Simultaneously, a corner of bank 127, 137 bites the outer surface of the cooling tube 14 into engagement therewith, thus joining the plate members 12, 13 and the cooling tube 14 together.

In this embodiment, because joining is made by deforming a part of the plate member 12, 13 by use of the jig 145, 146, freedom can be taken great as to structure and as to form, positional relationship, urge force, etc. of the pressing jig 145, 146. This makes it easy to stably secure and adjust the joining force.

In a FIG. 7 embodiment, by arranging the cooling tube 14 closely to the one plate member 13 and inserting separate members 149, 150, each of the one pair of the plate members 12, 13 and the cooling tube 14 are joined together. Meanwhile, the cooling tube 14 has a generally rectangular cross-section.

Figure 7A:
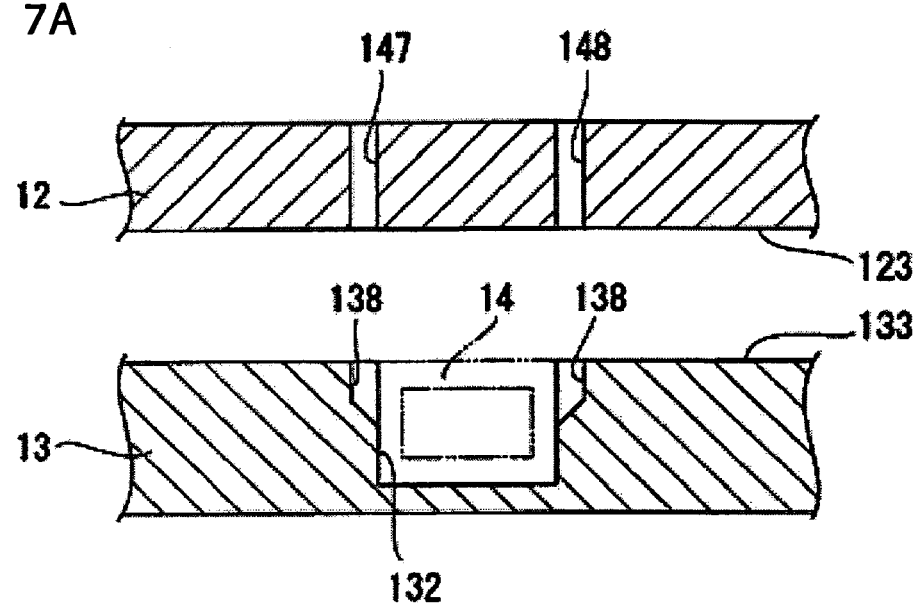
FIGS. 7A and 7B are explanatory views showing a modification of a manufacturing method for a cooling unit.

Namely, in the groove forming process, formed are a groove 132 generally rectangular in cross-section for receiving the entire cooling tube 14 and concaves 138 communicating with the groove, in the opposing surface 133 of one plate member 13. In the opposing surface 123 of the other plate member 12, formed are holes 147, 148 for separate member insertion (FIG. 7A). The concave 138 has a slant surface nearing the groove 132 as the depth thereof increases. Meanwhile, the holes 147, 148 are provided in corresponding positions to the concaves 138 of the opposite plate member 13. The use of casting (e.g. die-casting) or forging (e.g. cold/hot forging) makes it possible to easily form at low cost the plate members 12, 13 even in such a form. Suitable application is possible for a small-sized object.

Figure 7B:
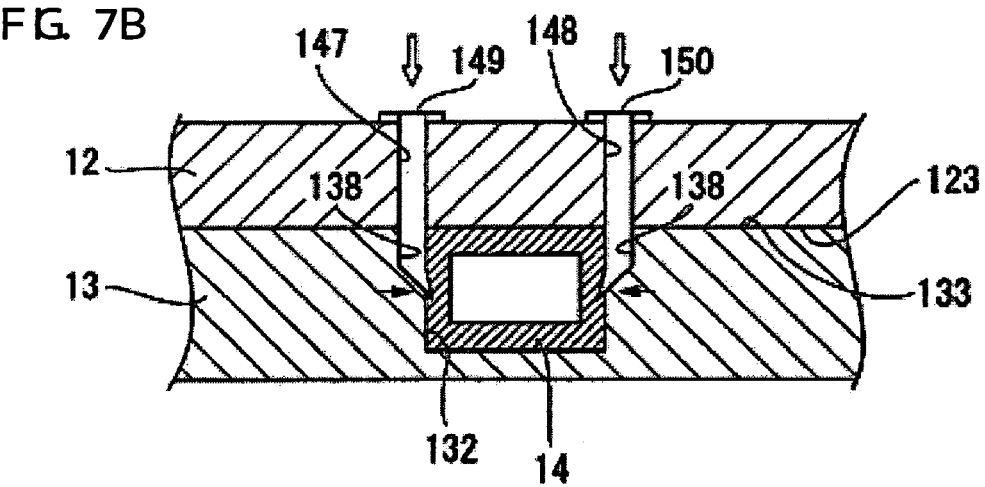

In the joining process, in a state the cooling tube 14 is received in the groove 132 of the plate member 13 and the one pair of plate members 12, 13 are placed in close contact at their opposite surfaces 123, 133, the separate members 149, 150 are respectively inserted in the holes 147, 148 of the plate member 12 (FIG. 7B). The separate members 149, 150 are respectively received in the holes 147, 148 of the plate member 12 and fit in the concaves 138 of the plate member 13 thus being engaged with the respective plate members 12, 13. Meanwhile, the separate member 149, 150 has a tip formed sharp having a slant surface and the other end in a rivet form broader one step than the other portion thereof. The separate member 149, 150 at its tip is moved along the slant surface of the concave 138 and deformed inward of the groove 132 into a biting in the outer surface of the cooling tube 14. Furthermore, by fixing the plate member 12 by the other-end step of the separate member 149, 150 (see FIG. 7B), the plate members 12, 13 and the cooling tube 14 are joined together through the separate members 149, 150.

In this embodiment, because the plate members 12, 13 are joined by using the separate members 149, 150, freedom can be taken great as to structure and as to form, positional relationship, urge force, etc. of the pressing jig 149, 150. This makes it easy to stably secure and adjust the joining force. Meanwhile, structural freedom can be enhanced from the viewpoint of arranging the cooling tube 14 closely to the one plate member 13. Meanwhile, where filling a heat conductive material, the heat conductive material is easy to arrange. Furthermore, since the cooling tube 14 has a generally rectangular sectional form, the shape of the surface 123 opposed to the plate member 12 is simplified making it easy to form the plate member 12. Incidentally, in this embodiment, although the separate member was made in a rivet form, a member stepless at the other end may be used to employ another method (fixing by screwing or so) on the joining means for the plate members 12, 13.

Filling of Heat Conductive Material

Here, for the cooling unit, heat transfer can be enhanced at between the plate members 12, 13 and the cooling tube 14 by filling a heat conductive material in the gap between the plate member 12, 13 (groove) and the cooling tube 14.

The heat conductive material preferably uses a well conductor of heat formed of a material having a high heat conductivity. Specifically, it uses a resin material mixed with a metal material, a resin material mixed with a carbon material or a hot melt, for example. The heat conductive material preferably has a heat conductivity of 3 W/(m·K) or higher, more preferably 5 W/(m·K). The hot melt usually has a heat conductivity of 5 W/(m·K) or higher. The resin material kneaded with a metal or carbon material includes those having a heat conductivity of 3 W/(m·K) or higher and those having a heat conductivity of 10 W/(m·K) or higher. Those include, as an example, D2 (registered trademark) by Cool Polymers (LCP resin+kneaded with heat conduction, 15 W/(m·K), thermal expansion ratio: 10×10^−6/K), RS007 (registered trademark) (PPS resin+kneaded with heat conduction, 3.5 W/(m·K), thermal expansion ratio: 20×10^−6/K).

Filling a heat conductive material can be carried out by applying a heat conductive material to the groove inner surface of the plate member 12, 13 and/or the outer surface of the cooling tube 14 prior to joining the plate members 12, 13 and the cooling tube 14. For applying the heat conductive material, various methods are usable that include spin coating, spray coating, roll coating, die coating, dip coating and liquid-drip ejection. Incidentally, after joining the plate members 12, 13 and the cooling tube 14, the heat conductive material may be filled (charged) in the gap between the groove of the plate members 12, 13 and the cooling tube 14.

In case the plate members 12, 13 and the cooling tube 14 are joined after applying the heat conductive material, the plate members 12, 13 and the cooling tube 14 are directly thermally connected in a contact area of between the groove of the plate members 12, 13 and the cooling tube 14. In a region a gap occurs, the both are thermally connected indirectly through the heat conductive material. Namely, heat transfer between the plate members 12, 13 and the cooling tube 14 is supplemented by the heat conductive material, to improve the heat transfer characteristic at between the plate members 12, 13 and the cooling tube 14. Meanwhile, where the heat conductive material has an adhesion force, such a force can be utilized as a force to bond together the plate members 12, 13 and the cooling tube 14 or the like.

Meanwhile, in the bonding, the heat conductive material is preferably softened/flowed as required. For example, where the heat conductive material is thermoplastic, the heat conductive material is heated during the bonding. In this case, the plate members 12, 13 are heated during bonding through an object (jig) holding the plate members 12, 13 or a high-temperature fluid is caused to flow in the cooling tube 14. By softening/flowing the heat conductive material, the heat conductive material is filled throughout all the regions of the gap between the groove of the plate members 12, 13 and the cooling tube 14.

Meanwhile, the heat conductive material preferably has an elasticity in a temperature range for using the cooling plate (plate members 12, 13). By the elasticity possessed by the heat conductive material, the heat conductive material expands and contracts responsive to the change in the gap between the plate members 12, 13 and the cooling tube 14 due to thermal deformation, etc. This stably maintains the thermal connection of the plate members 12, 13 and the cooling tube 14.

The cooling unit and manufacturing method thereof in the invention described so far is to be preferably applied to various optical devices that the optical elements thereof are required to cool. The application can reduce the cost and size of the optical devices.

Projector Structure

Description is now made on an embodiment of a projector, as an application example of the cooling unit. In the following embodiment, the foregoing cooling unit 10 and manufacturing method thereof can be applied to a liquid cooling unit 46 (see FIG. 8) referred later.

In this case, the optical element 11 (see FIG. 1) is to be applied to at least one of liquid-crystal panels 441R, 441G, 441B, incident-side polarizer plates 442 and exit-side polarizer plates 443 (see FIG. 11), which will be referred later.

Likewise, the plate members 12, 13 are to be applied to at least one of a liquid-crystal panel holder frame 445 (frame member 4451, frame member 4452), an incident-side polarizer light holder frame 446 (frame member 4461, frame member 4462) and an exit-side polarizer plate holder frame 447 (frame member 4471, frame member 4472).

Likewise, the cooling tube 14 is to be applied to the element cooling tube 463 (liquid-crystal panel cooling tube 4631R, incident-side-polarizer cooling tube 4632R and exit-side-polarizer cooling tube 4633R).

By applying the foregoing cooling unit and manufacturing method thereof to the liquid cooling unit 46 referred later, the projector can be reduced in cost and size.

Figure 8:
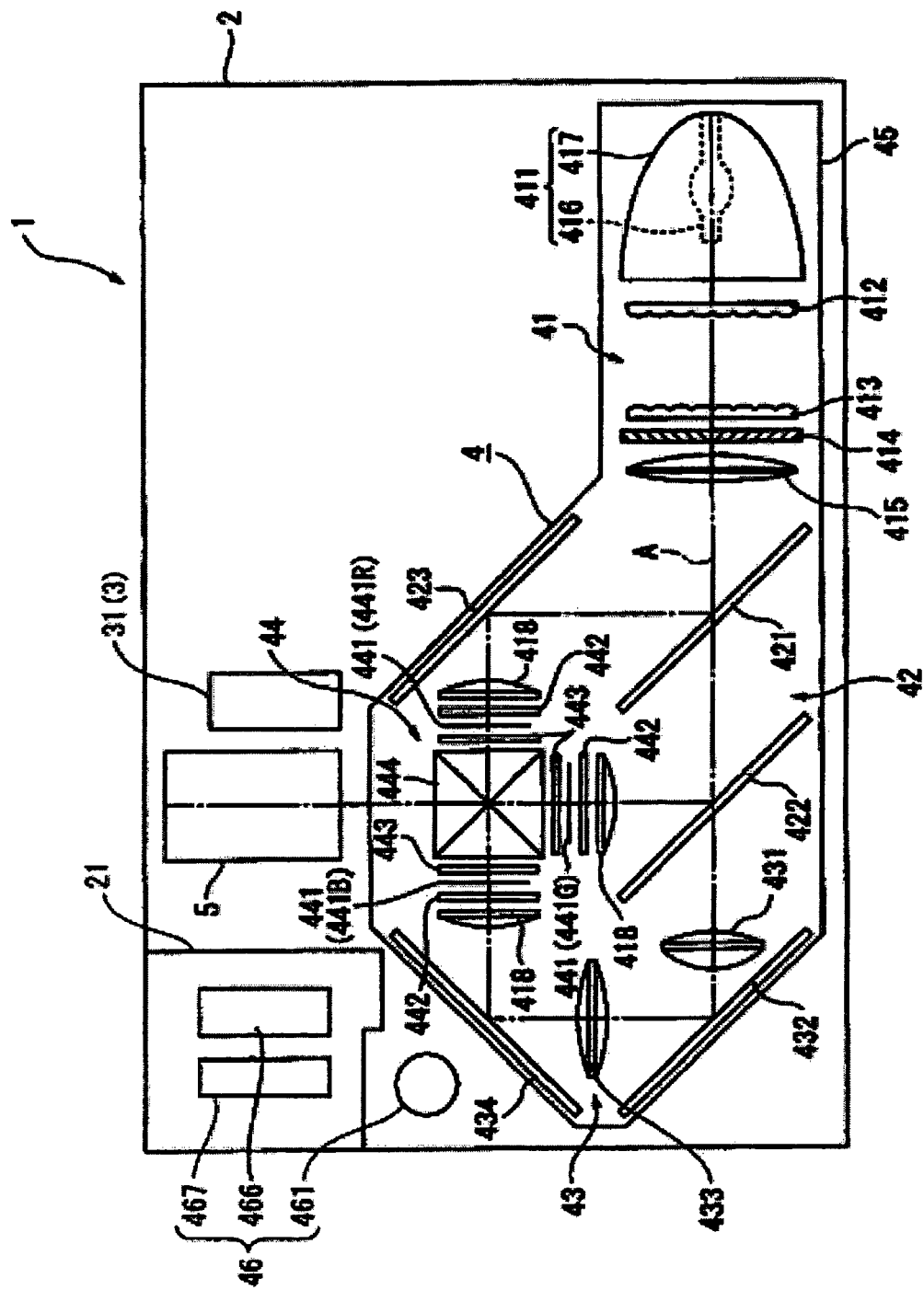
FIG. 8 is a view typically showing the schematic structure of a projector.

FIG. 8 is a view typically showing a schematic construction of a projector 1.

The projector 1 is to modulate the luminous flux emitted from a light source according to image information into an optical image and project, with magnification, the formed optical image onto a screen. The projector 1 has an exterior case 2, an air-cooling device 3, an optical unit 4 and a projection lens 5 as a projection optical device.

Incidentally, although not shown in FIG. 8, a power source block, a lamp drive circuit, etc. are assumed arranged in the space of other than the air cooling device 3, optical unit 4 and projection lens 5, within the exterior case 2.

The exterior case 2 is structured of a synthetic resin or the like, and wholly formed generally in a rectangular form to accommodate the air cooling device 3, optical unit 4 and projection lens 5 therein. This exterior case 2, though not shown, is structured with an upper case structuring a top surface, a front surface, a rear surface and side surfaces of the projector 1, and a lower case structuring a bottom surface, a front surface, side surfaces and a rear surface of the projector 1. The upper case and the lower case are fixed with each other by screws, etc.

Incidentally, the exterior case 2 is not limited to a synthetic resin, etc., but may be formed of another material, e.g. of a metal.

Meanwhile, although not shown, the exterior case 2 is formed with an air intake port (e.g. air intake port 22 shown in FIG. 9) for introducing air from the outside into inside of the projector 1 (e.g. air intake port 22 shown in FIG. 9) and an air discharge port for discharging the air heated within the projector 1.

Furthermore, the exterior case 2 is formed with a partition wall 21 positioned laterally of the projection lens 5 and at a corner of the exterior case 2, to isolate the radiator 446 and axial fan 467, hereinafter referred, of the optical unit 4 from other members.

The air-cooling unit 3 is to feed cooling air into a cooling passageway formed in the projector 1 and cooling the heat generated in the projector 1. The air cooling device 3, positioned lateral of the projection lens 5, has a sirocco fan 31 for introducing the cooling air outside the projector 1 into the inside through the air intake port not shown formed to the exterior case 2, a power-source block not shown, a cooling fan for cooling the lamp drive circuit, etc., and so on.

The optical unit 4 is a unit for optically processing the luminous flux emitted from the light source and forming an optical image (color image) according to image information. This optical unit 4 has the entire form generally in an L-form, in plan, extending generally along the back surface of the exterior case 2 and along the side surface of the exterior case 2 as shown in FIG. 8. Incidentally, the detail structure of the optical unit 4 will be referred later.

The projection lens 5 is structured as a gang lens having a plurality of lenses in combination. The projection lens 5 is to project, with magnification, the optical image (color image) formed by the optical unit 4 onto the not-shown screen.

Optical Unit Detail Structure

The optical unit 4 has an optical-component housing 45 accommodating therein an optical integrator illumination system 41, a color separation system 42, a relay system 43 and an optical device 44, and a liquid cooling unit 46, as shown in FIG. 8.

The optical integrator illumination system 41 is an optical system for nearly uniformly illuminating an image-forming region of a liquid-crystal panel, referred later, structuring the optical device 44. The optical integrator illumination system 41 has a light-source unit 411, a first lens array 412, a second lens array 413, a polarization conversion element 414 and a superimposing lens 415, as shown in FIG. 8.

The light-source unit 411 has a light-source lamp 416 for emitting radial rays of light, and a reflector 417 for reflecting the light emitted from the light source lamp 416. The light-source lamp 416, in frequent cases, uses a halogen lamp, a metal halide lamp or a high-pressure mercury lamp. Meanwhile, the reflector 417 employs a radiation mirror in FIG. 8. However, this is not limitative, but the structure may employ a collimating concave lens structured by an elliptic mirror and for collimating the luminous flux reflected by the elliptic mirror toward the luminous-flux exit side into collimated light.

The first lens array 412 has a structure arranged, in a matrix form, with small lenses each having generally a rectangular contour as viewed in the optical axis. The small lenses are to segment the luminous flux emitted from the light-source unit 411 into a plurality of partial luminous fluxes.

The second lens array 413 has a structure nearly similar to the first lens array 412, which has a structure arranged with small lenses in a matrix form. The second lens array 413, cooperating with superimposing lens 415, has a function to focus the small-lens-based images of the first lens array 412 onto a liquid-crystal panel, referred later, of the optical device 44.

The polarization conversion element 414 is arranged between the second lens array 413 and the superimposing lens 415 and for converting the light of from the second lens array 413 into nearly one sort of polarization light.

Specifically, the portions of light, converted into nearly one sort of polarization light by the polarization conversion element 414, are finally superimposed onto the liquid-crystal panel, referred later, of the optical device 44 by the superimposed lens 415. Because the projector using a liquid-crystal panel of a polarization-light modulation type can use only one sort of polarization light, it is impossible to utilize nearly a half of the light of from the light-source unit 411 issuing random polarization light. For this reason, by using the polarization conversion element 414, the emission light of from the light-source unit 411 is converted into nearly one sort of polarization light, thus enhancing the light utilization efficiency at the optical device 44.

The color separation system 42 has two dichroic mirrors 421, 422 and a reflection mirror 423, as shown in FIG. 8. This has a function to separate the plurality of partial luminous fluxes exited from the optical integrator illumination system into three colors of light, i.e. red (R), green (G) and blue (B) by the dichroic mirrors 421 and 422.

The relay system 43 has an incident-side lens 431, a relay lens 433 and reflection mirrors 432, 434, as shown in FIG. 8. This has a function to guide the blue light separated by the color separation system 42 to a liquid-crystal panel for blue light, referred later, of the optical device 44.

On this occasion, the dichroic mirror 421 of the color separation system 42 reflects a red light component of the luminous flux exited from the optical integrator illumination system 41, but allows green and blue components to transmit. The red light reflected by the dichroic mirror 421 reflects upon the reflection mirror 423 and reaches a liquid-crystal panel for red light, referred later, of the optical device 44 through a field lens 418. This field lens 418 converts the partial luminous fluxes exited from the second lens array 413 into a collimated luminous flux parallel with the axis thereof (major ray of light). This is true for the other field lenses 418 provided on the light incident side of the green and blue light liquid-crystal panels.

Of the green light and blue light transmitted the dichroic mirror 421, the green light reflects upon the dichroic mirror 422 and reaches the green-light liquid-crystal panel, referred later, of the optical device 44 through the field lens 418. Meanwhile, the blue light transmits the dichroic mirror 422 and passes the relay system 43 and further passes the filed lens 418, thus reaching the blue-light liquid-crystal panel, referred later, of the optical device 44. Incidentally, the reason of using the relay system 43 for the blue light is in order to prevent the lower in light utilization efficiency due to light scattering, etc. because the blue light is longer in optical passageway than other colors of light. Namely, although such a structure is provided because the partial color light entered the incident-side lens 431 has a longer optical path, it is possible to consider a structure having an optical path increased for red light.

The optical device 44 is integrally structured with three liquid-crystal panels 441 (assumed as a red-light liquid-crystal panel 441R, a green-light liquid-crystal panel 441G and a blue-light liquid-crystal panel 441B) as light modulators, three incident-side polarizer plates 442 and three exit-side polarizer plates 443 as optical converter elements arranged on the luminous-flux incident and exit sides of the liquid-crystal panels 441, and cross-dichroic prism 444 as a color combining device, as shown in FIG. 8.

Although not shown in detail, the liquid-crystal panel 441 has a structure sealed with a liquid crystal as an electro-optical substance between a pair of transparent glass substrates. The liquid crystal is controlled in its orientation state in accordance with a drive signal outputted from a not-shown control device, to modulate the polarization of the polarized luminous flux exited from the incident-side polarizer plate 442.

The colors, of light made uniform in its polarization nearly in one direction by the polarization conversion element 414, enters the incident-side polarizer plate 442 where, of the optical fluxes entered, only the polarization light, nearly the same in direction as the polarization axis of the luminous flux made uniform by the polarization conversion element 414, is allowed to transmit while the other luminous fluxes are absorbed (light absorption type).

The incident-side polarizer plate 442, though not shown in detail, has a structure that a polarization film is spread over a light-transmissive substrate of sapphire glass or quartz. The light-absorbing-type polarization film is formed by uniaxially extending a film containing iodine or dye molecules, having a merit of comparatively high optical quenching ratio and comparatively small incident-angle dependence.

The exit-side polarizer plate 443 is nearly similar in structure to the incident-side polarizer plate 442. This is to transmit only the luminous flux having a polarization axis orthogonal to the transmission axis of the luminous flux at the incident-side polarizer plate 442 among luminous fluxes emitted from the liquid crystal panel 441 but absorbs the other luminous fluxes (light-absorbing type).

The cross-dichroic prism 444 is an optical element for combining together the optical images modulated color-by-color exited from the exit-side polarizer plate 443 and forming a color image. The cross-dichroic prism 444 is generally square in plan that four rectangular prisms are bonded together. Two dielectric multi-layer films are formed in the interfaces the rectangular prisms are bonded together. Those dielectric multi-layer film is to reflect the colors of light exited from the liquid-crystal panel 441R, 441B through the exit-side polarizer plate 443 but transmit the colors of light exited from the liquid-crystal panel 441G through the exit-side polarizer plate 443. In this manner, the colors of light modulated at the liquid-crystal panels 441R, 441G, 441B are combined together and formed into a color image.

The optical-component housing 45, structured by a metal member for example, is internally established with a predetermined illumination-light axis A so that the foregoing optical components 41-44 can be accommodated and arranged in predetermined positions relative to the illumination-light axis. Note that the optical-component housing 45 is not limited to the metal member but may be structured of another material. Particularly, it is preferably structured of a heat conductive material.

The liquid cooling unit 46 is to cool mainly the optical device 44 by circulating a cooling fluid. This has main tank 461 temporarily reserving the cooling fluid, a radiator 466 as a heat sink for dissipating the heat of the cooling fluid, and an axial fan 467 for blowing the cooling air to the radiator 466. Besides those, there are provided a fluid feeder, an element cooling tube, a branch tank, a confluent tank, a pipe and so on.

Figure 9:
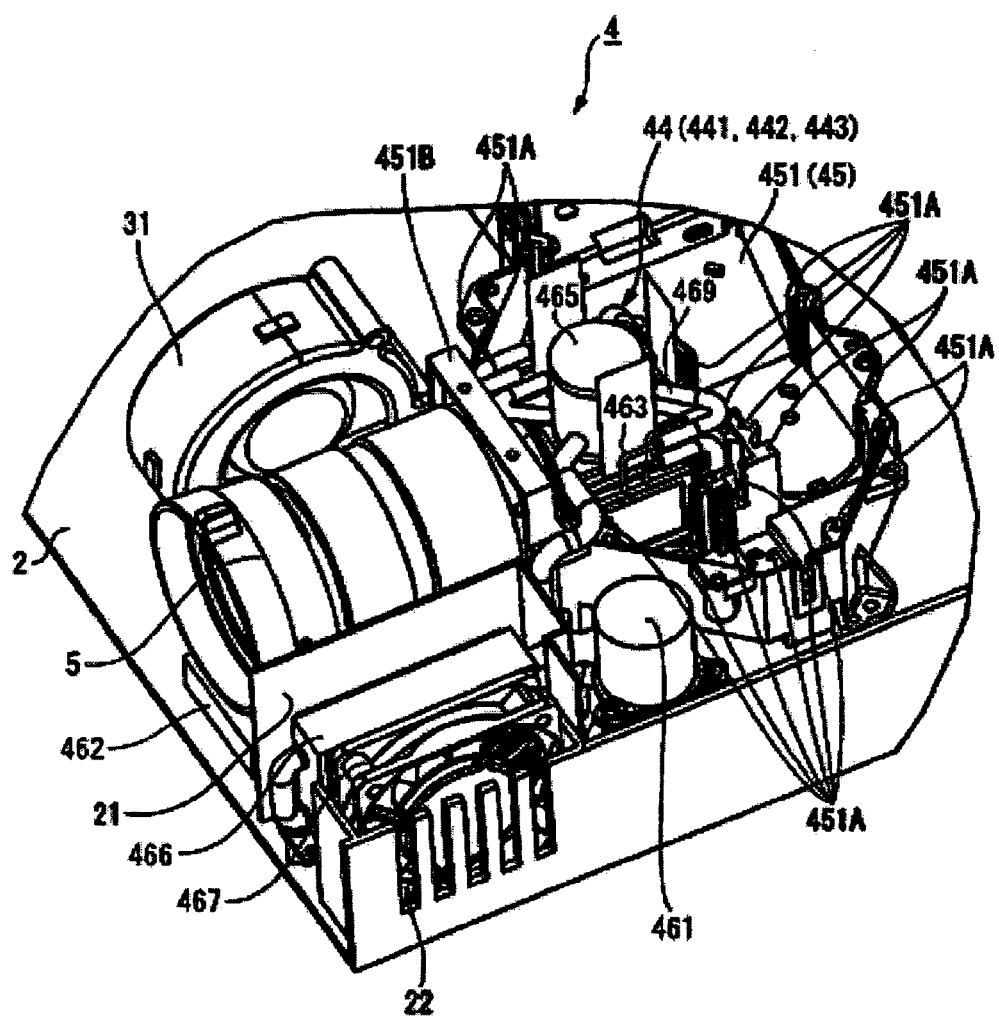
FIG. 9 is a perspective view of a part in interior of the projector as viewed from the above.
Figure 10:
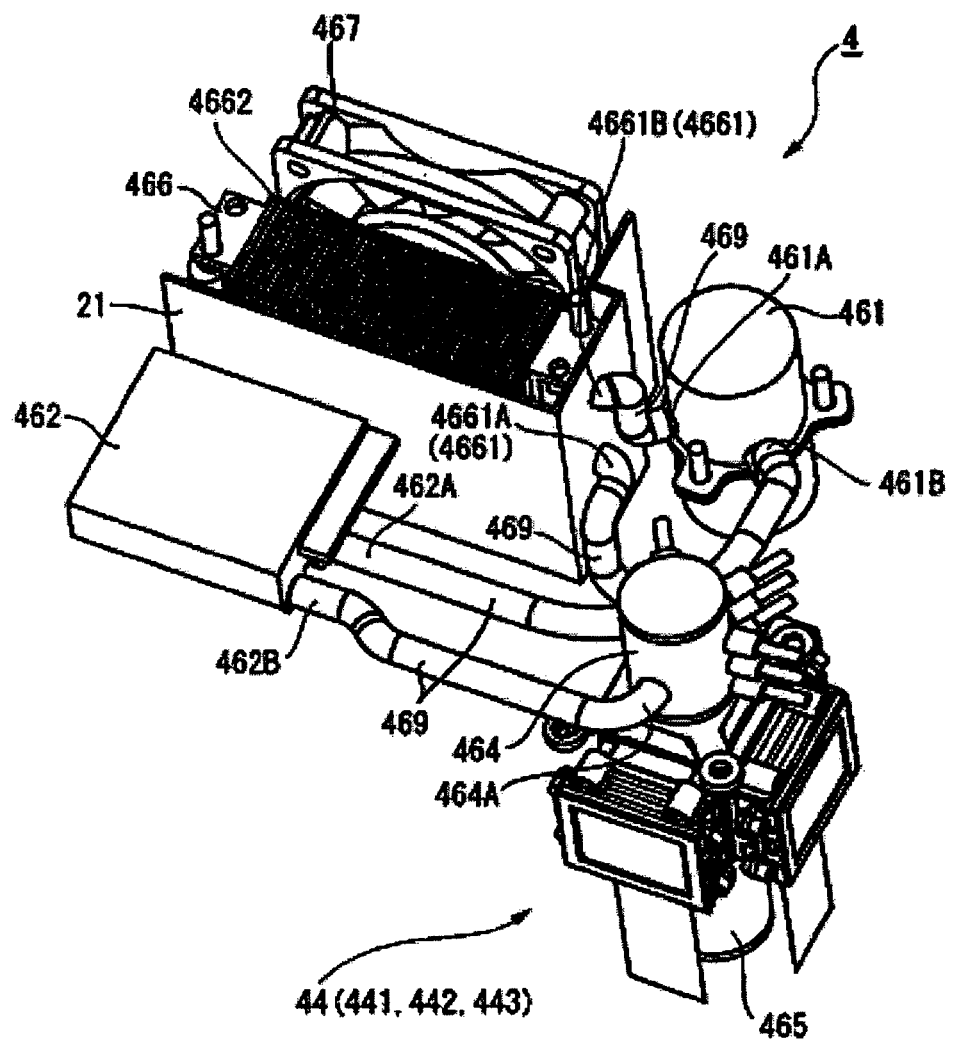
FIG. 10 is a perspective view of an optical unit and liquid cooling unit in the projector as viewed from the below.

Here, FIG. 9 is a perspective view of a part of the projector 1 interior as viewed from the above while FIG. 10 is a perspective view of mainly the optical device 44 and liquid cooling unit 46 inside the projector 1 as viewed from the below.

Note that, in FIG. 9, the optical components in the optical component housing 45 are shown only the optical device 44 for simplifying the explanation with other optical components 41-43 omitted. Meanwhile, in FIGS. 9 and 10, the members in the liquid cooling unit 46 are omitted in part thereof in order to simplify the explanation.

As shown in FIG. 9, the optical component housing 45 is structured including a component accommodation member 451 and a lid-like member, not shown, closing the opening of the component accommodation member 451.

Of these, the component accommodation member 451 configures a bottom surface, front surface and side surfaces of the optical component housing 45.

In the component accommodation member 451, a groove 451A is formed in the inner surface of its sidewall as shown in FIG. 9, which serves to fit, by sliding, the optical components 41-44 therein from the above.

Meanwhile, in front of the sidewall, a projection lens mounter 451B is formed to set up the projection lens 5 in a predetermined position relative to the optical unit 4, as shown in FIG. 9. The projection lens mounter 451B is formed generally rectangular in plan. In nearly a central region in plan, there is formed a circular hole, not shown, correspondingly to a luminous-flux emitting position of from the optical device 44 so that the color image formed by the optical unit 4 is projected, with magnification, by the projection lens 5 through the hole.

Liquid Cooling Unit

Description is now made in detail on the liquid cooling unit 46.

In FIGS. 9 and 10, the liquid cooling unit 46 has a main tank 461, a liquid feeder 462 (FIG. 10), element cooling tube 463, a branch tank 464 (FIG. 10), a confluent tank 465, a radiator 466, an axial fan 467, a pipe 469, and so on.

The main tank 461 wholly is generally in a circular cylindrical form structured with two vessel-like members of metal such as aluminum as shown in FIGS. 9 and 10. By connecting the openings of the two vessel-like members with each other, the cooling fluid is temporarily stored therein. These vessel-like members are connected by intervening a seal weld or an elastic member such as of rubber.

In a peripheral surface of the main tank 461, there are formed an inlet 461A and an outlet 461B for the cooling fluid, as shown in FIG. 10.

The inlet 461A and the outlet 461B are structured of tubular members and arranged on the main tank 461 in a manner protruding inward and outward thereof. The inlet 461A has an outward-protrusion end connected with one end of the pipe 469. Through the pipe 469, the cooling fluid flows from the external into the main tank 461. Meanwhile, the outlet 461B has an outward-protrusion end connected with one end of the pipe 469. Through the pipe 469, the cooling fluid in the main tank 461 flows out thereof.

Meanwhile, in the main tank 461, the inlet 461A and the outlet 461B are in a positional relationship generally orthogonal to each other at their axes. This prevents the cooling fluid entered the main tank 461 through the inlet 461A from immediately exiting outside through the outlet 461B. By the mixing action at the inside of the main tank 461, the cooling fluid can be made uniform in quality and temperature. The cooling fluid exited the main tank 461 is fed to the fluid feeder 462 through the pipe 469.

The fluid feeder 462 is to suck the cooling fluid therein from the main tank 461 and forcibly discharge the cooling fluid toward the branch tank 464 as shown in FIG. 10. Namely, connection is provided between the outlet 461B of the main tank 461 and the inlet 462A of the fluid feeder 462 through the pipe 469 while connection is provided between the outlet 462B of the fluid feeder 462 and the inlet 464A of the branch tank 464 through the pipe 469.

Specifically, the fluid feeder 462 has a structure arranged with an impeller within a hollow member generally in a rectangular parallelepiped made of a metal such as aluminum, for example. Under control of a not-shown control device, the impeller is rotated. Due to this, the cooling fluid accumulated in the main tank 461 is forcibly sucked through the pipe 469, and the cooling fluid is forcibly discharged outside through the pipe 469. With such a structure, the impeller can be reduced in thickness dimensions with respect to the rotary axis thereof, thus achieving downsizing and space saving. In this embodiment, the fluid feeder 462 is arranged below the projection lens 5 as shown in FIG. 9 or 10.

The element cooling tube 463 is arranged adjacent the elements, i.e. the liquid-crystal panel 441, the incident-side polarizer plate 442 and the exit-side polarizer plate 443. Heat change is made between the cooling fluid flowing in the element cooling tube 463 and the devices 441, 442, 443.

Figure 11:
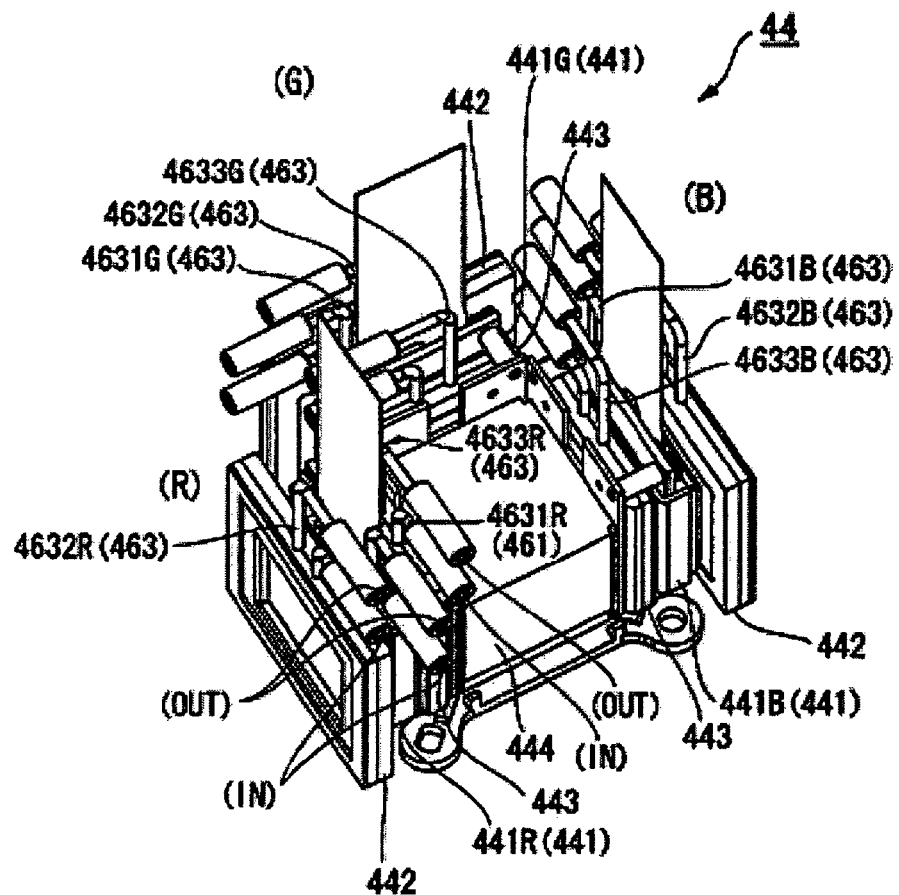
FIG. 11 is a perspective view showing the overall structure of the optical device.

Here, FIG. 11 is a perspective view showing the entire structure of the optical device 44.

In FIG. 11, the optical device 44 is integrally structured with the three liquid-crystal panels 441 (red-light liquid-crystal panel 441R, green-light liquid-crystal panel 441G and blue-light liquid-crystal panel 441B), polarizer plates (incident-side polarizer plates 442, exit-side polarizer plates 443) arranged on the incident or exit side of each liquid-crystal panel 441, and a cross dichroic prism 444, as noted before.

The exit-side polarizer plate 443, the liquid-crystal panel 441 and the incident-side polarizer plate 442 are arranged, in order, over the cross dichroic prism 444 on a color-by-color basis of red (R), green (G) and blue (B).

The element cooling tube 463 is arranged separately for the liquid-crystal panel 441, the incident-side polarizer plate 442 and the exit-side polarizer plate 443.

Specifically, the element cooling tube 463 includes, as to red light, a liquid-crystal-panel cooling tube 4631R arranged in a peripheral edge of the liquid-crystal panel 441R, an incident-side cooling tube 4632R arranged in a peripheral edge of the incident-side polarizer plate 442, and an exitt-side cooling tube 4633R arranged in a peripheral edge of the exit-side polarizer plate 443. The cooling fluid is allowed to enter each tube at the inlet (IN) of the element cooling tube 4631R, 4632R, 4633R, flow along the peripheral edge of the device 441R, 442, 443, and then exit at the outlet (OUT) of the tube.

Likewise, the element cooling tube 463 includes, as to green light, a liquid-crystal-panel cooling tube 4631G arranged in a peripheral edge of the liquid-crystal panel 441G, an incident-side cooling tube 4632G arranged in a peripheral edge of the incident-side polarizer plate 442, and an exit-side cooling tube 4633G arranged in a peripheral edge of the exit-side polarizer plate 443. Meanwhile, as to blue light, included are a liquid-crystal-panel cooling tube 4631B arranged in a peripheral edge of the liquid-crystal panel 441B, an incident-side cooling tube 4632B arranged in a peripheral edge of the incident-side polarizer plate 442, and an exit-side cooling tube 4633B arranged in a peripheral edge of the exit-side polarizer plate 443.

In this embodiment, the holder frame holds the elements, i.e. the liquid-crystal panel 441, the incident-side polarizer plate 442 and the exit-side polarizer plate 443, at their peripheral edges. The holder frame is arranged therein with the element cooling tubes 463 respectively extending nearly a round along the peripheral edges of the elements. In the same one side of the elements 441, 442, 443, there are arranged the inlets (IN) and outlets (OUT) of the element cooling tubes 463.

Incidentally, the element holder frame and the element cooling tubes 463 will be described later as to their detailed structures.

Referring back to FIGS. 9 and 10, the branch tank 464 is to branch the cooling fluid fed from the fluid feeder 462 toward the element cooling tubes 463, as shown in FIG. 10.

Meanwhile, the confluent tank 465 is to join together the cooling fluids fed from the respective element cooling tubes 463 and store them temporarily, as shown in FIG. 9.

In this embodiment, the branch tank 464 is arranged on one surface of the cross dichroic prism 444 for the optical device 44 while the confluent tank 465 is arranged on opposite one surface of the cross dichroic prism 444. The branch tank 464 and confluent tank 465 may be in another arrangement position without limited to the above.

Figure 12:
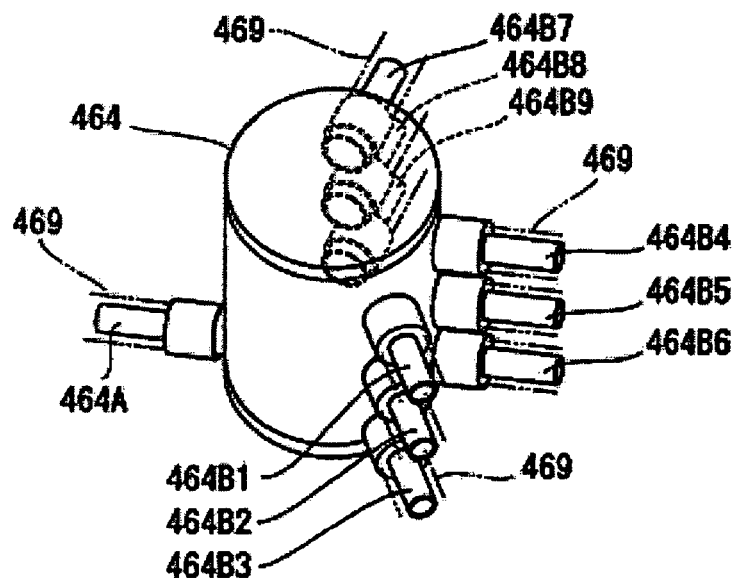
FIG. 12 is a perspective view showing the overall structure of a branch tank.
Figure 13:
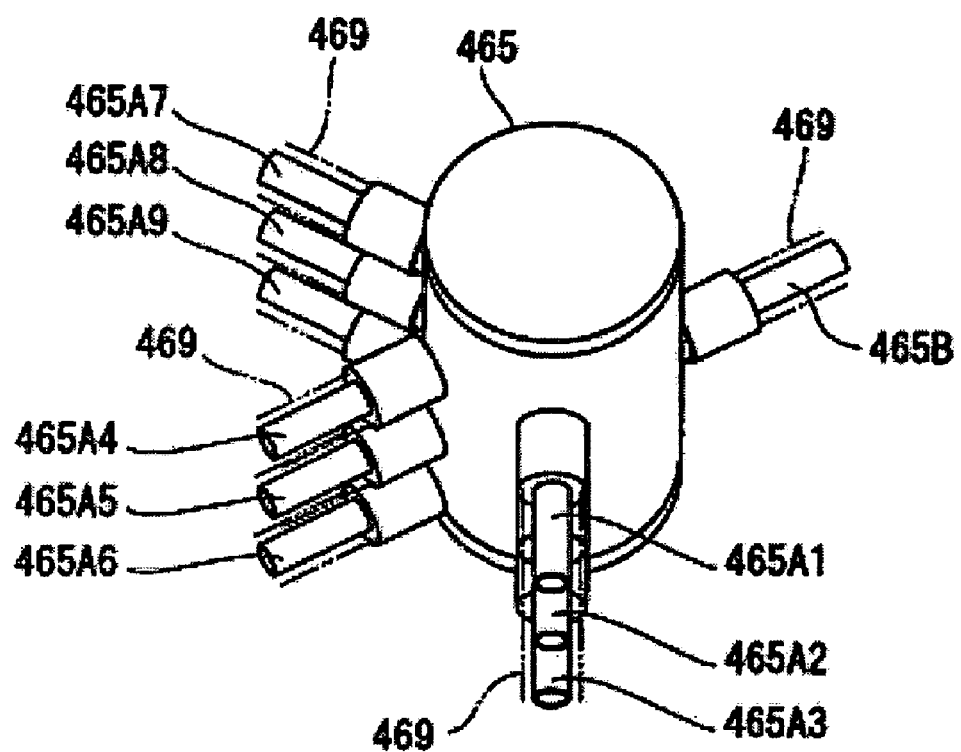
FIG. 13 is a perspective view showing the overall structure of a confluent tank.

Here, FIG. 12 is a perspective view showing the entire structure of the branch tank 464 while FIG. 13 is a perspective view showing the entire structure of the confluent tank 465.

As shown in FIG. 12, the branch tank 464 is structured by a closed vessel-like member having generally a circular cylindrical form in the entire thereof and of a metal such as aluminum, as shown in FIG. 12. This is to temporarily store a cooling fluid therein.

In a peripheral surface of the branch tank 464, formed are a cooling-fluid inlet 464A and an outlet 4641B1, 464B2, . . . 464B9.

These inlet 464A and the outlets 464B1-464B9 are structured of tubular members and arranged in a manner protruding inward and outward of the branch tank 464. The inlet 464A has an outward protruding end connected with one end of the pipe 469. Through the pipe 469, the cooling fluid flows from the fluid feeder 462 (see FIG. 10) into the branch tank 464. Meanwhile, the outlets 464B1-464B9 have the respective outward-protrusion ends connected separately with one end of the pipe 469. Through the pipe 469, the cooling fluid in the branch tank 464 flows toward the device cooling tubes 463 (see FIG. 11).

Similarly to the branch tank 464, the confluent tank 465 is structured by a closed vessel-like member having generally a circular cylindrical form in the entire thereof and of a metal such as aluminum, as shown in FIG. 13. This is to temporarily store a cooling fluid therein.

In a peripheral surface of the confluent tank 465, formed are cooling-fluid inlets 465A1, 465A2, . . . 465A9 and an outlet 465B.

These inlets 465A1-465A9 and the outlet 465B are structured of tubular members and arranged on the main tank 465 in a manner protruding inward and outward thereof. The inlets 465A1-465A9 have respective outward-protrusion ends connected separately with one end of the pipe 469. Through the pipe 469, the cooling fluid is allowed to flow from the fluid feeder 463 (see FIG. 11) into the confluent tank 465. Meanwhile, the outlet 465B have an outward-protrusion end connected with one end of the pipe 469. Through the pipe 469, the cooling fluid in the confluent tank 465 is to flow toward the radiator 466 (see FIG. 11).

Referring back to FIGS. 9 and 10, the radiator 466 has a tubular member 4661 for flowing a cooling fluid and a plurality of radiation fins 4662 connected to the tubular member.

The tubular member 4661 is formed by a member having a high heat conductivity, such as aluminum, allowing the cooling fluid entered at the inlet 4661A to flow therein toward the outlet 4661B. Connection is provided between the inlet 4661A of the tubular member 4661 and the outlet 465B of the confluent tank 465 through the pipe 469 while connection is provided between the outlet 4661B of the tubular member 4661 and the main tank 461 through the tank 469.

The plurality of radiation fins 4662 are formed by plate members having a high heat conductivity such as aluminum, thus being made in a parallel arrangement. Meanwhile, the axial fan 467 is structured to blow the cooling air to the radiator 466 at one surface thereof.

In the radiator 466, the heat of the cooling fluid flowing in the tubular member 4661 is released through the radiation fins 4662, wherein such heat release is accelerated due to the supply of cooling air by the axial fan 467.

Incidentally, the pipe 469 uses a metal, e.g. aluminum, as a forming material thereof, but another material, e.g. resin, may be employed.

The cooling fluid uses, for example, ethyleneglycol as a transparent nonvolatile liquid but may use another liquid. Note that the cooling fluid in the invention is not limited to liquid but may use a mixture of liquid and solid, etc.

As described above, in the liquid cooling unit 46, the cooling fluid is allowed to flow the main tank 461, the fluid feeder 462, the branch tank 464, the element cooling tube 463, the confluent tank 465 and the radiator 466 in the order through the pipe 469. The cooling fluid returns from the radiator 466 to the main tank 461. Thus, the flow is repeated through the above passageway.

In the liquid cooling unit 46, by flowing the cooling fluid in the element cooling tubes 463, the elements 441, 442, 443 are properly removed of the heat caused due to luminous-flux illumination, etc., thus suppressing the elements 441, 442, 443 from rising in temperature. The heat of the elements 441, 442, 443 is transferred to the cooling fluid in the element cooling tubes 463 through the holder frames of the elements.

Element Holder Frame and Element Cooling Tube

Description is now made on the device holder frame and device cooling tube. Although explanation is representatively on those related to red light, which is true for those related to green light and blue light.

Figure 14:
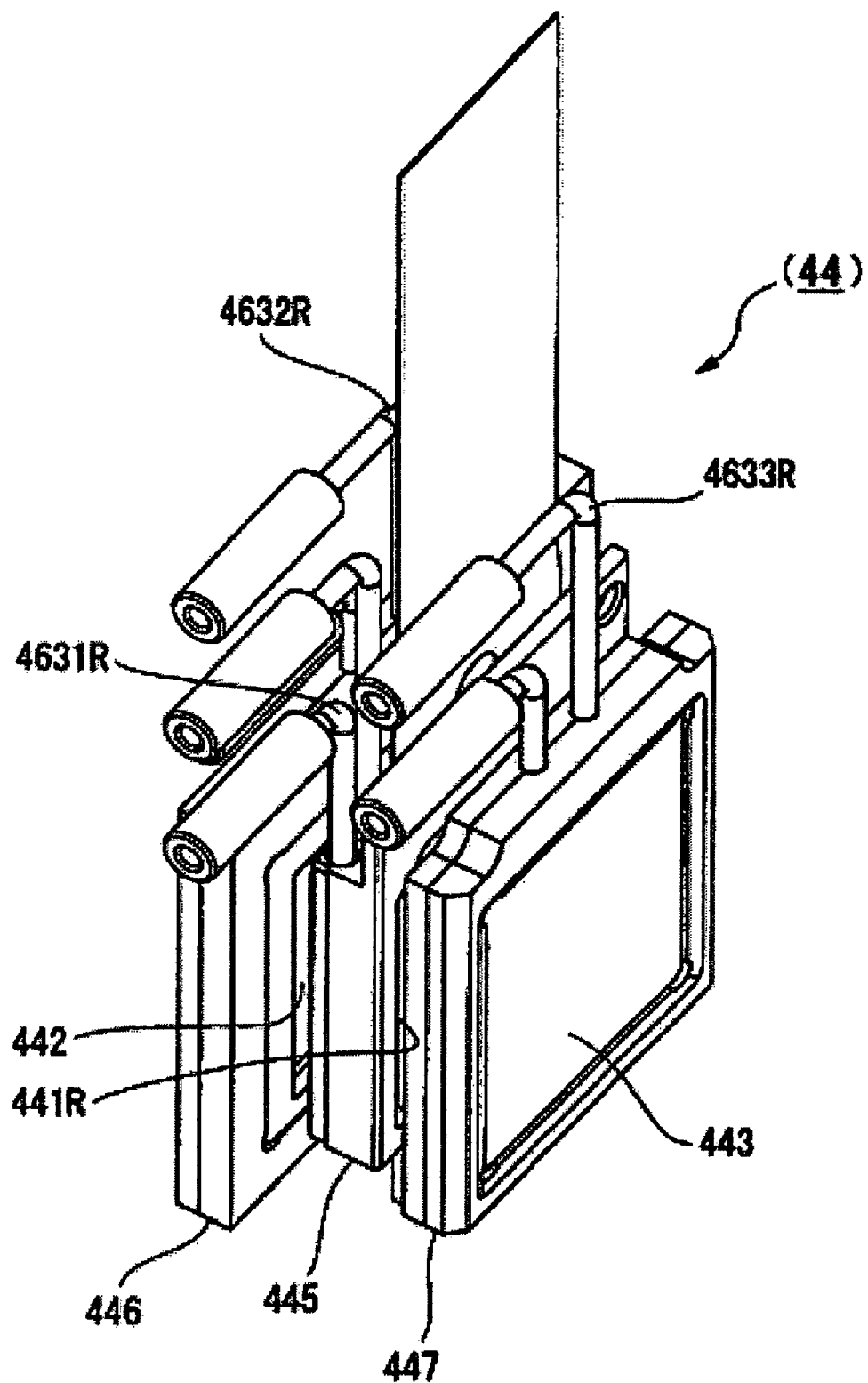
FIG. 14 is a partial perspective view showing a panel structure for red light in the optical device.

FIG. 14 is a partial perspective view showing a red-light panel structure in the optical device 44.

As shown in FIG. 14, as for red light, the liquid-crystal panel 441R at its peripheral edge is held in the liquid-crystal-panel holder frame 445, the incident-side polarizer plate 442 at its peripheral edge is held in the incident-side-polarizer holder frame 446, and the exit-side polarizer plate 443 at its peripheral edge is held in the exit-side-polarizer holder frame 447. Each of the holder frames 445, 446, 447 has a rectangular aperture, referred later, corresponding to the image-forming area of the liquid-crystal panel 441R so that a luminous flux can pass through the aperture.

The liquid-crystal-panel holder frame 445 is arranged therein with a liquid-crystal-panel cooling tube 4631R extending along the peripheral edge of the liquid-crystal panel 441R, the incident-side-polarizer holder frame 446 is arranged therein with a incident-side-polarizer cooling tube 4632R extending along the peripheral edge of the incident-side polarizer plate 442, and the exit-side-polarizer holder frame 447 is arranged therein with an exit-side-polarizer cooling tube 4633R extending along the peripheral edge of the exit-side polarizer plate 443.

Figure 15:
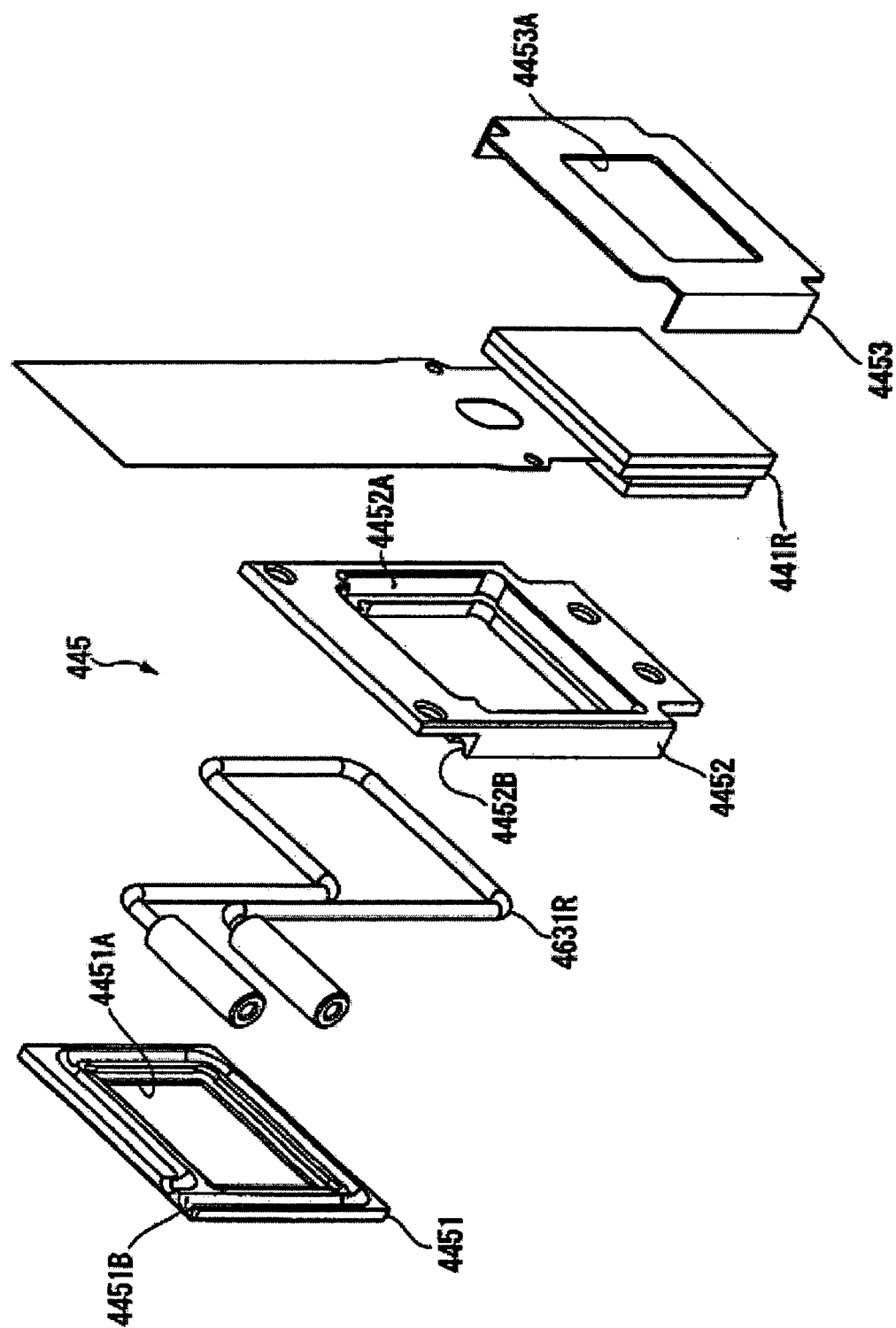
FIG. 15 is an exploded perspective view of a liquid-crystal-panel holder frame.
Figure 16A:
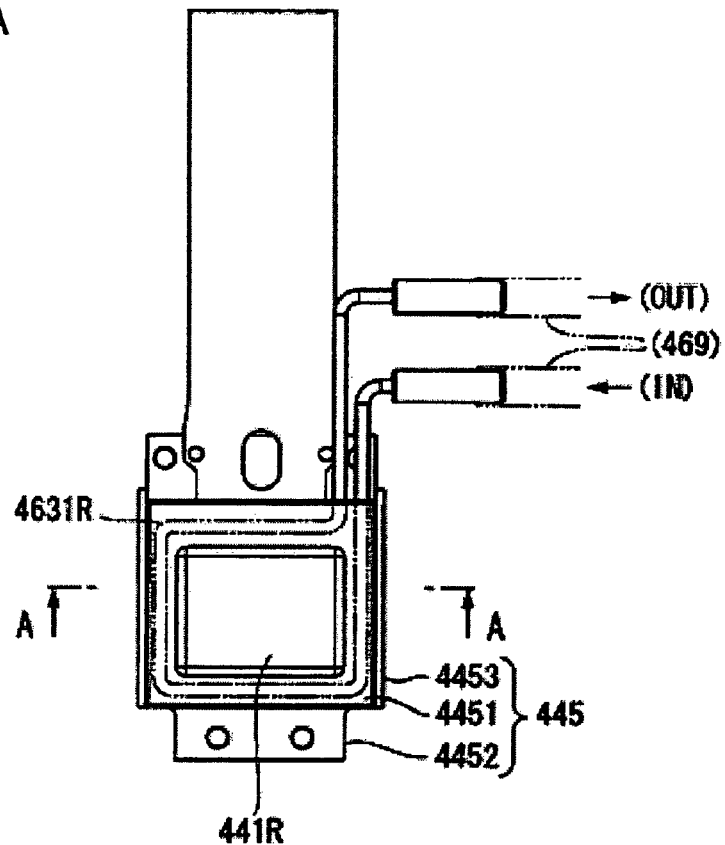
Figure 16B:
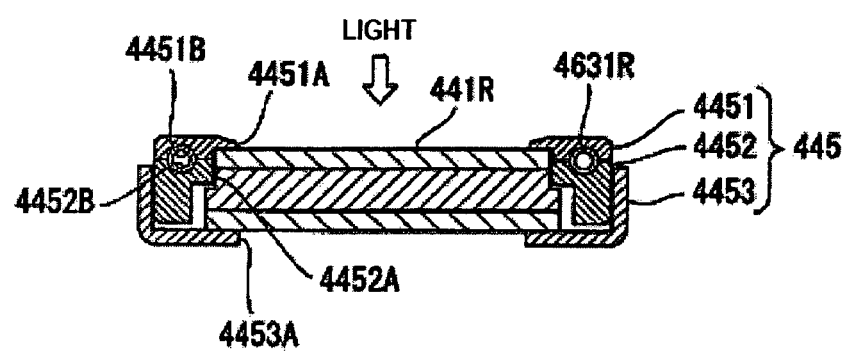
FIG. 16B is a cross-sectional view on line A-A in FIG. 16A.

FIG. 15 is an exploded perspective view of the liquid-crystal-panel holder frame 445. FIG. 16A is an assembly front view of the liquid-crystal-panel holder frame 445 while FIG. 16B is a cross-sectional view on A-A in FIG. 16A.

The liquid-crystal-panel holder frame 445 includes a pair of frame members 4451, 4452 and a liquid-crystal-panel fixing plate 4453, as shown in FIG. 15.

Here, the liquid-crystal panel 441R is a transmission type having a structure sealed with a liquid-crystal layer between a pair of transparent substrates. The one pair of substrates include a drive substrate formed with a data line, scanning line, switching element, pixel electrode, etc. for applying a drive voltage to the liquid crystal, and a counter substrate formed with a common electrode, black matrix, etc.

The frame members 4451, 4452 are respectively frames generally rectangular in plan, each having an aperture 4451A, 4452A in a rectangular form corresponding to the image-forming area of the liquid-crystal panel 441R and a groove 4451B, 4452B for receiving the liquid-crystal-panel cooling tube 4631R. The frame member 4451 and the frame member 4452 are arranged opposite to each other sandwiching the liquid-crystal-panel cooling tube 4631R between them. The frame member 4451, 4452 preferably uses a well conductor of heat of a material having a high heat conductivity, e.g. applicable with aluminum (234 W/(m·K)), magnesium (156 W/(m·K)) or its alloy (alumi-dicast alloy (approximately 100 W/(m·K)), Mg—Al—Zn alloy (approximately 50 W/(m·K)), and various metals besides those. Meanwhile, the frame member 4451, 4452 may be another material (resin or the like) having a high heat conductivity (e.g. 5 W/(m·K) or higher) without limited to the metal material.

The liquid-crystal-panel fixing plate 4453 is formed by a plate member having a rectangular aperture 4453A corresponding to the image-forming area of the liquid-crystal panel 441R as shown in FIG. 15. This is fixed onto the frame member 4452 sandwiching the liquid-crystal panel 441R. The liquid-crystal-panel fixing plate 4453 is arranged in contact with the liquid-crystal panel 441R as shown in FIG. 16B, thus having a function to place the frame members 4451, 4452 and the liquid-crystal panel 441R in close contact and hence in thermal connection with each other and a function to release the heat of the liquid-crystal panel 441R. Meanwhile, part of the heat of the liquid-crystal panel 441R is transferred to the frame member 4451, 4452 through the liquid-crystal-panel fixing plate 4453.

The liquid-crystal-panel cooling tube 4631R is formed by a pipe or tube having an annular cross-section and extending along the axis thereof, for example. As shown in FIG. 15, it is bent conforming to the shape of the groove 4451B, 4452B of the frame member 4451, 4452. The liquid-crystal-panel cooling tube 4631R preferably uses a well conductor of heat formed of a material having a high heat conductivity, e.g. applicable with various metals besides aluminum, copper, stainless steel or an alloy thereof. Meanwhile, the liquid-crystal-panel cooling tube 4631R may be another material (resin material or the like) having a high heat conductivity (e.g. 5 W/(m·K) or higher) without limited to metal materials.

Specifically, the liquid-crystal-panel cooling tube 4631R is arranged, nearly a round, outer than the peripheral edge of the liquid-crystal panel 441R and along the peripheral edge of the liquid-crystal panel 441R, as shown in FIGS. 16A and 16B. Namely, in the inner surface (mating surface, opposite surface) of the frame member 4451, 4452, a groove 4451B, 4452B generally semicircular in section is formed nearly a round along the edge of the aperture 4451A, 4452A wherein the groove 4451B and the groove 4452B are nearly in a relationship in form of mirror symmetry. In a state the liquid-crystal-panel cooling tube 4631R is received in the grooves 4451B, 4452B, the frame members 4451, 4452 are joined with each other. In this embodiment, the liquid-crystal-cooling tube 4631R is a circular cylindrical pipe having an outer diameter nearly equal to the thickness of the liquid-crystal panel 441R.

For joining the frame members 4451 and the frame members 4452 together, various methods are applicable including tightening with screws, adhesion, welding, mechanical joining such as fitting and so on. In joining, preferably used is a method that is high in heat transfer characteristic between the liquid-crystal-panel cooling pipe 4631R and the frame members 4451, 4452 (or the liquid-crystal panel 441R).

The liquid-crystal-panel cooling tube 4631R has one end arranged with the inlet (IN) for cooling fluid and the other end arranged with the outlet (OUT). The inlet and the outlet of the liquid-crystal-panel cooling tube 4631R are respectively connected to the pipes (pipes 469) for cooling fluid circulation.

The cooling fluid, entered in the liquid-crystal-panel cooling tube 4631R from the inlet (IN), flows nearly a round along the peripheral edge of the liquid-crystal-panel cooling tube 4631R, then exits at the outlet (OUT). Meanwhile, the cooling fluid deprives the liquid-crystal panel 441R of heat while flowing in the liquid-crystal-panel cooling tube 4631R. Namely, the heat of the liquid-crystal panel 441R is transferred to the cooling fluid in the liquid-crystal-panel cooling tube 4631R through the frame member 4451, 4452, thus being conveyed to the outside.

Here, the liquid-crystal-panel holder frame 445 is arranged with the liquid-crystal-panel cooling pipe 4631R closely to the luminous-flux incident surface of the liquid-crystal panel 441R with respect to the thickness of the liquid-crystal panel 441R, as shown in FIG. 16B. In the liquid-crystal panel 441R, heat absorption is generally greater on the incident-side where black matrix is arranged than that on the exit side. For this reason, by arranging the liquid-crystal-panel cooling tube 4631R closely to the incident-side where temperature is ready to rise, the heat of the liquid-crystal panel 441R is effectively removed.

Furthermore, because a step is provided in the side surface of the liquid-crystal panel 441R, the exit surface thereof is broader in area than the incident surface. Consequently, by arranging the liquid-crystal-panel cooling tube 4631R closely to the incident-side smaller in area, the arrangement of structural elements is improved in efficiency thus enabling the size reduction for the device.

Figure 17A:
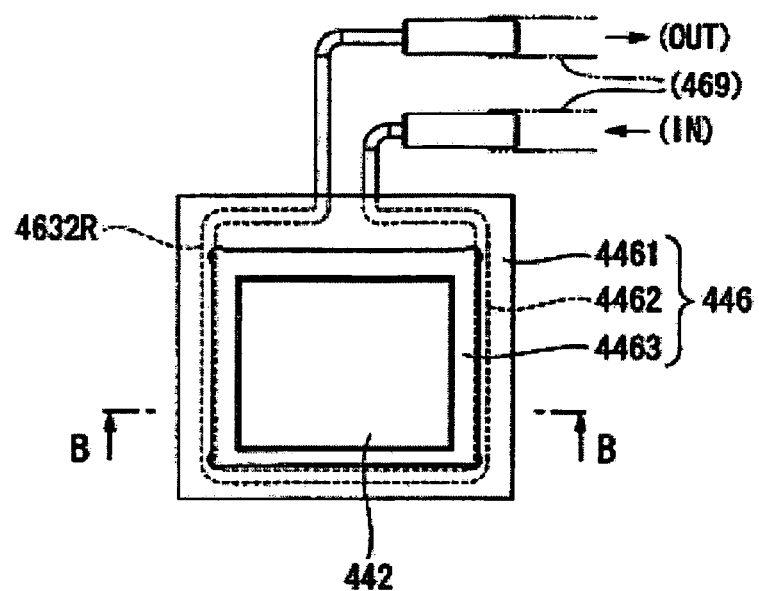
Figure 17B:
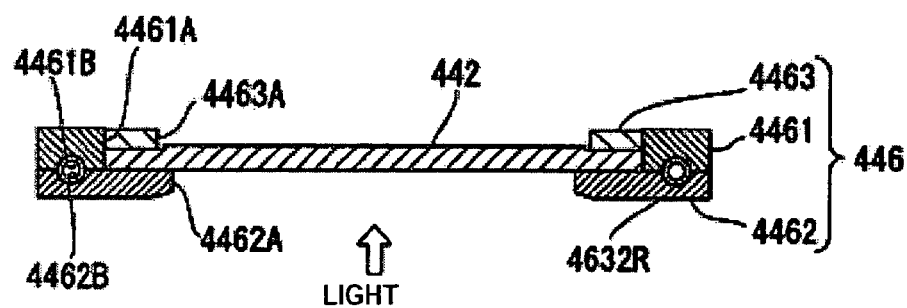
FIG. 17B is a cross-sectional view on line B-B in FIG. 17A.

FIG. 17A is an assembly front view of the incident-side polarizer holder frame 446 while FIG. 17B is a cross-sectional view on B-B shown in FIG. 17A.

The incident-side polarizer holder frame 446 is nearly similar in structure to the liquid-crystal-panel holder frame 445 (see FIG. 15). It includes a pair of frame members 4461, 4462 and a polarizer fixing plate 4463, as shown in FIGS. 17A and 17B.

Here, the incident-side polarizer plate 442 is structured by a light-transmissive substrate over which a polarization film is spread.

The frame members 4461, 4462 are frames generally rectangular in plan, each having a rectangular aperture 4461A, 4462A corresponding to the light-transmission area of the incident-side polarizer plate 442 and a groove 4461B, 4462B for receiving the incident-side ploarizer cooling tube 4632R. The frame member 4461 and the frame member 4462 are oppositely arranged sandwiching the incident-side polarizer cooling tube 4632R. The frame member 4461, 4462 preferably uses a well conductor of heat of a material having a high heat conductivity, e.g. applicable with various metals of aluminum, magnesium or an alloy thereof. Meanwhile, the frame member 4461, 4462 may be another material (e.g. resin) having a high heat conductivity (e.g. 5 W/m·k) or higher without limited to the metal material.

The polarizer fixing plate 4463 is formed by a plate member having a rectangular aperture 4463A corresponding to the light-transmission area of the incident-side polarizer plate 442, as shown in FIGS. 17A and 17B. This is fixed onto the frame member 4461 sandwiching the incident-side polarizer plate 442. The polarizer fixing plate 4463 is arranged in contact with the incident-side polarizer plate 442 as shown in FIG. 17B, thus having a function to place the frame members 4461, 4462 and the incident-side polarizer plate 442 in close contact and hence in thermal connection with each other and a function to release the heat of the incident-side polarizer plate 442. Meanwhile, part of the heat of the incident-side polarizer plate 442 is transferred to the frame member 4461, 4462 through the polarizer fixing plate 4463.

The incident-side polarizer cooling tube 4632R is a seamless pipe formed by pultrusion, drawing or so, and bent conforming to the shape of the groove 4461B, 4462B of the plate member 4461, 4462. The incident-side polarizer cooling tube 4632R preferably uses a well conductor of heat of a material having a high heat conductivity, e.g. applicable with aluminum, copper, stainless steel or an alloy thereof and, besides those, various metals. Meanwhile, the incident-side polarizer cooling tube 4632R may be of another material (e.g. resin) having a high heat conductivity (e.g. 5 W/(m·K) or higher) without limited to the metal material.

Specifically, the incident-side polarizer cooling tube 4632R is arranged nearly a round along the peripheral edge of the incident-side polarizer plate 442, in a position outer than the peripheral edge of the incident-side polarizer plate 442. Namely, in the inner surface (mating surface, opposite surface) of the frame member 4461, 4462, a groove 4461B, 4462B generally semicircular in cross-section is formed nearly a round along the edge of the aperture 4461A, 4462A wherein the groove 4461B and the groove 4462B are nearly in a relationship in form of mirror symmetry. In a state the liquid-crystal-panel cooling tube 4632R is received in the grooves 4461B, 4462B, the frame members 4461, 4462 are joined with each other. In this embodiment, the incident-side polarizer cooling tube 4632R is a circular cylindrical pipe having an outer diameter nearly equal to the thickness of the incident-side polarizer plate 442.

For joining the frame members 4461 and the frame members 4462 together, various methods are applicable including tightening with screws, adhesion, welding, mechanical joining such as fitting and so on. In joining, preferably used is a method that is high in heat transfer characteristic between the incident-side polarizer cooling tube 4632R and the frame members 4461, 4462 (or the incident-side polarizer plate 442).

The incident-side polarizer cooling tube 4632R has one end arranged with the inlet (IN) for cooling fluid and the other end arranged with the outlet (OUT). The inlet and the outlet of the incident-side polarizer cooling tube 4632R are respectively connected to the pipes (pipes 469) for cooling fluid circulation.

The cooling fluid, entered the incident-side polarizer cooling tube 4632R from the inlet (IN), flows nearly a round along the peripheral edge of the incident-side polarizer plate 442, then exits at the outlet (OUT). Meanwhile, the cooling fluid deprives the incident-side polarizer plate 442 of heat while flowing in the incident-side polarizer cooling tube 4632R. Namely, the heat of the incident-side polarizer plate 442 is transferred to the cooling fluid in the incident-side polarizer cooling tube 4632R through the frame member 4461, 4462, thus being conveyed to the outside.

Figure 18A:
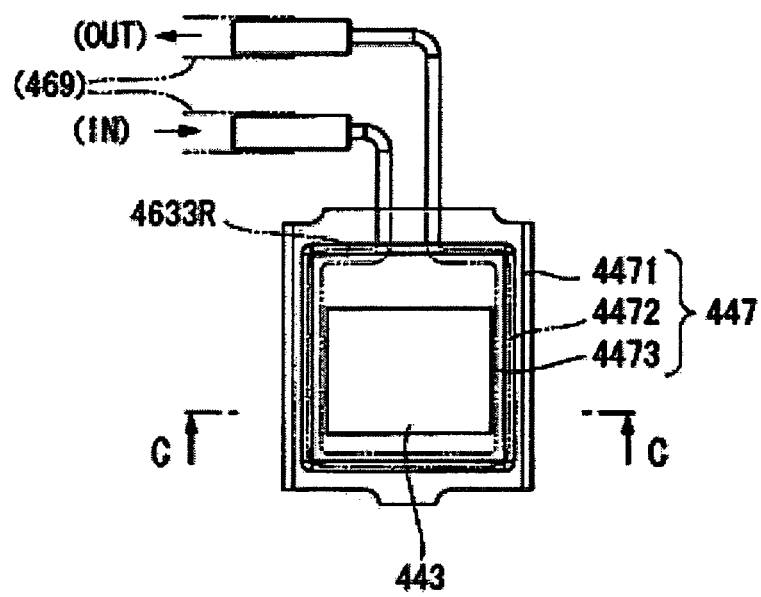
Figure 18B:
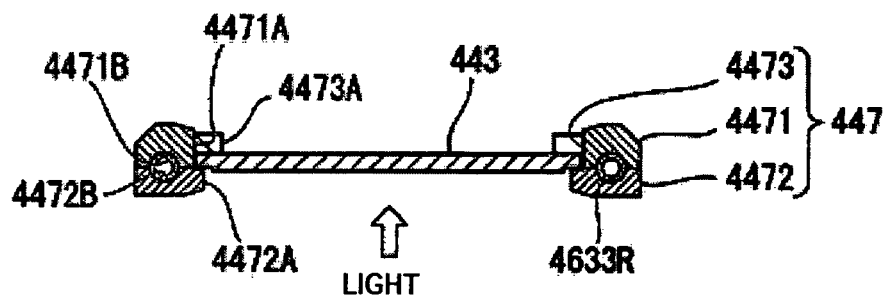
FIG. 18B is a cross-sectional view on line C-C in FIG. 18A.

FIG. 18A is an assembly front view of the exit-side polarizer holder frame 447 while FIG. 18B is a cross-sectional view on C-C shown in FIG. 18A.

The exit-side polarizer holder frame 447, similar in structure to the incident-side polarizer holder frame 446 (see FIG. 17), includes a pair of frame members 4471, 4472 and a polarizer fixing plate 4473 as shown in FIGS. 18A and 18B.

Here, the exit-side polarizer plate 443 is structured by a light-transmissive substrate over which a polarization film is spread, similarly to the incident-side polarizer plate 442.

The frame member 4471, 4472 are frames generally rectangular in plan, each having a rectangular aperture 4471A, 4472A corresponding to the light-transmission area of the exit-side polarizer plate 443 and a groove 4471B, 4472B for receiving the exit-side ploarizer cooling tube 4633R. The frame member 4471 and the frame member 4472 are oppositely arranged sandwiching the exit-side polarizer cooling tube 4633R. The frame member 4471, 4472 preferably uses a well conductor of heat of a material having a high heat conductivity, e.g. applicable with various metals of aluminum, magnesium or an alloy thereof. Meanwhile, the frame member 4471, 4472 may be another material (e.g. resin) having a high heat conductivity (e.g. 5 W/(m·K) or greater) without limited to the metal material.

The polarizer fixing plate 4473 is formed by a plate member having a rectangular aperture 4473A corresponding to the light-transmission area of the exit-side polarizer plate 443, as shown in FIGS. 18A and 18B. This is fixed onto the frame member 4471 sandwiching the exit-side polarizer plate 443. The polarizer fixing plate 4473 is arranged in contact with the exit-side polarizer plate 443 as shown in FIG. 18B, thus having a function to place the frame members 4471, 4472 and the exit-side polarizer plate 443 in close contact and hence in thermal connection with each other and a function to release the heat of the exit-side polarizer plate 443. Meanwhile, part of the heat of the exit-side polarizer plate 443 is transferred to the frame member 4471, 4472 through the polarizer fixing plate 4473.

The exit-side polarizer cooling tube 4633R is a seamless pipe formed by pultrusion, drawing or so, and bent conforming to the shape of the groove 4471B, 4472B of the plate member 4471, 4472. The exit-side polarizer cooling tube 4633R preferably uses a well conductor of heat of a material having a high heat conductivity, e.g. applicable with aluminum, copper, stainless steel or an alloy thereof and, besides those, various metals. Meanwhile, the exit-side polarizer cooling tube 4633R may be another material (e.g. resin) having a high heat conductivity (e.g. 5 W/(m·K) or higher) without limited to the metal material.

Specifically, the exit-side polarizer cooling tube 4633R is arranged nearly a round along the peripheral edge of the exit-side polarizer plate 443, in a position outer than the peripheral edge of the incident-side polarizer plate 443, as shown in FIGS. 18A and 18B. Namely, in the inner surface (mating surface, opposite surface) of the frame member 4471, 4472, a groove 4471B, 4472B generally semicircular in cross-section is formed nearly a round along the edge of the aperture 4471A, 4472A wherein the groove 4471B and the groove 4472B are nearly in a relationship in form of mirror symmetry. In a state the exit-side polarizer cooling tube 4633R is received in the grooves 4471B, 4472B, the frame members 4471, 4472 are joined with each other. In this embodiment, the exit-side polarizer cooling tube 4633R is a circular cylindrical pipe having an outer diameter nearly equal to the thickness of the incident-side polarizer plate 443.

For joining the frame members 4471 and the frame members 4472 together, various methods are applicable including tightening with screws, adhesion, welding, mechanical joining such as fitting and so on. In joining, preferably used is a method that is high in heat transfer characteristic between the exit-side polarizer cooling tube 4633R and the frame members 4471, 4472 (or the exit-side polarizer plate 443).

The exit-side polarizer cooling tube 4633R has one end arranged with the inlet (IN) for cooling fluid and the other end arranged with the outlet (OUT). The inlet and the outlet of the exit-side polarizer cooling tube 4633R are respectively connected to the pipes (pipes 469) for cooling fluid circulation.

The cooling fluid, entered the exit-side polarizer cooling tube 4633R from the inlet (IN), flows nearly a round along the peripheral edge of the exit-side polarizer plate 443, and then exits at the outlet (OUT). Meanwhile, the cooling fluid deprives the exit-side polarizer plate 443 of heat while flowing in the exit-side polarizer cooling tube 4633R. Namely, the heat of the exit-side polarizer plate 443 is transferred to the cooling fluid in the exit-side polarizer cooling tube 4633R through the frame member 4471, 4472, thus being conveyed to the outside.

In this manner, in this embodiment, the element cooling tubes 4631R, 4632R, 4633R are arranged, as to red light, in the holder frames of the respective elements, i.e. the liquid-crystal panel 441R, the incident-side polarizer plate 442 and the exit-side polarizer plate 443. By the cooling fluid flowing in the element cooling tube 4631R, 4632R, 4633R, the element 441R, 442, 443 is removed of heat appropriately. Namely, the element 441R, 442, 443 and the element cooling tube 4631R, 4632R, 4633R are thermally connected through the holder frame 445, 446, 447, thus enabling heat exchange at between the element 441R, 442, 443 and the element cooling tube 4631R, 4632R, 4633R. Due to this, the heat of the element 441R, 442, 443 is transferred to the cooling fluid in the element cooling tube 4631R, 4632R, 4633R through the holder frame 445, 446, 447. By moving the heat of the element 441R, 442, 443 to the cooling fluid, the element 441R, 442, 443 are cooled down.

Meanwhile, in this embodiment, because the element cooling tube 4631R, 4632R, 4633R is arranged nearly a round along the peripheral edge of the element 441R, 442, 443, the area of heat conduction can be increased to effectively cool each of the elements.

Moreover, because the passageway of cooling fluid (element cooling tube 4631R, 4632R, 4633R) is arranged along the peripheral edge of the element 441R, 442, 443, there is no passage of luminous fluxes for image formation, thus avoiding the optical image formed at the liquid-crystal panel 441R from including an image of air bubbles or dusts in the cooling fluid or from being caused fluctuations due to a temperature distribution on the cooling fluid.

Meanwhile, in this embodiment, because the cooling-fluid passageway in the peripheral edge of each element 441R, 442, 443 is formed by a tube (element cooling tube 4631R, 4632R, 4633R), the junctions for passageway formation are required in a comparatively reduced number. The decreased number or area of junctions simplifies the structure and prevents the cooling fluid from leaking.

In this manner, according to the present embodiment, the elements 441R, 442, 443 can be effectively suppressed from rising in temperature while suppressing the occurrence of troubles due to using the cooling fluid.

Incidentally, in the structure the element cooling tube 4631R, 4632R, 4633R is arranged in the element holder frame 445, 446, 447, the holder frame 445, 446, 447 serves as both of holding means and cooling means for the elements 441R, 442, 443. As a result, size reduction is easy to achieve and preferable application is possible to a small-sized optical element.

For example, in this embodiment, the element 441R, 442, 443 is arranged with the element cooling tube 4631R, 4632R, 4633R having an outer diameter nearly equal to the thickness of the element, in a position outer than the peripheral edge thereof. This can suppress the thickness from increasing due to the provision of the cooling-fluid passageway.

Although descriptions were so far made representatively on the red-light panel structure and its cooling structure of the optical device 44 (see FIG. 11), those are true for green light and blue light, i.e. the elements (liquid-crystal panel, incident-side polarizer plate, exit-side polarizer plate) are separately supported on the holder frames, to arrange the element cooling tubes in the holder frames.

Namely, in this embodiment, the optical elements totally nine, including three liquid-crystal panels 441R, 441G, 441B, three incident-side polarizer plates 442 and three exit-side polarizer plates 442, are to be separately cooled by use of a cooling fluid. By separately cooling the elements, it is possible to positively prevent the trouble caused by the temperature rise on each element.

Piping System

Figure 19:
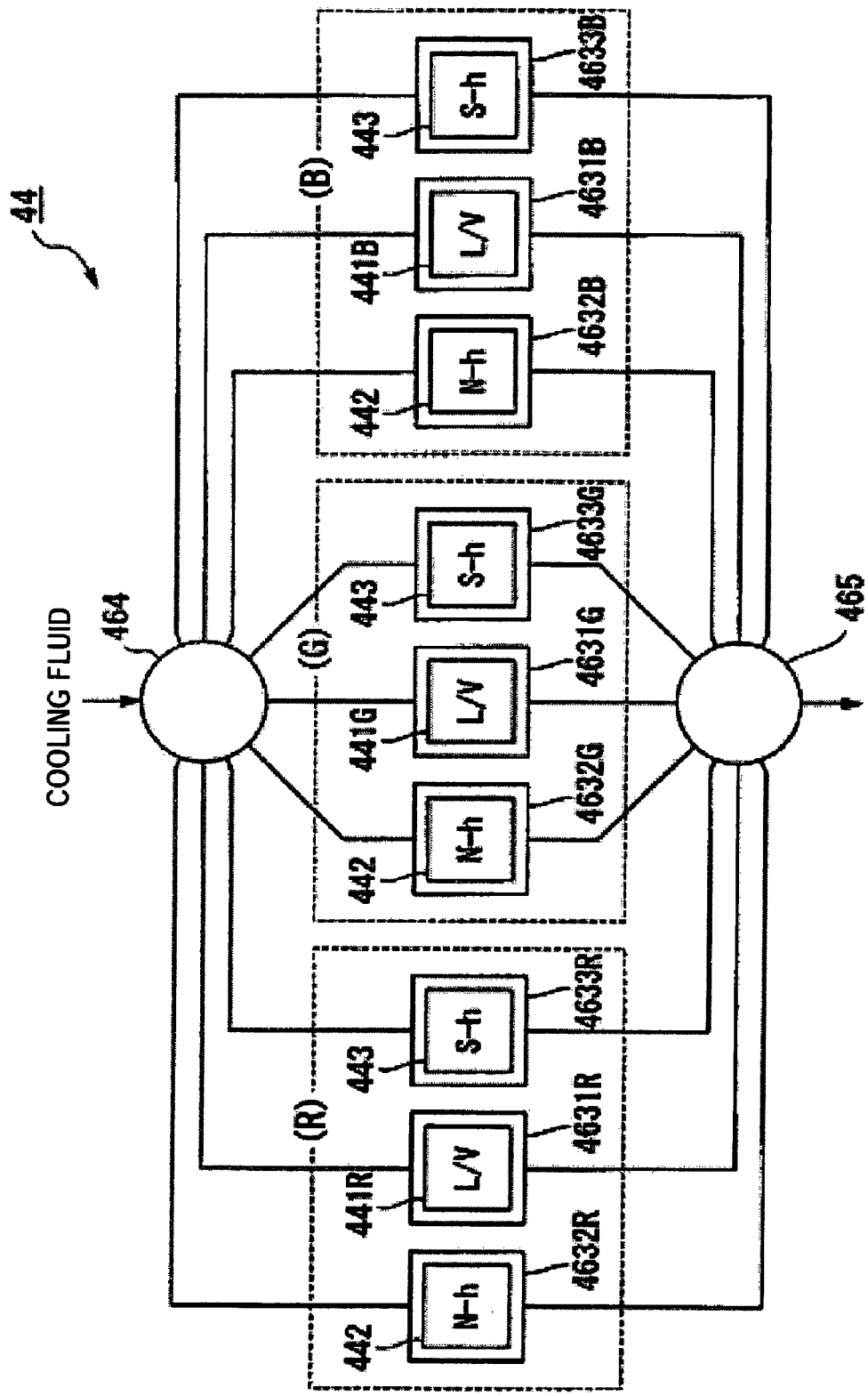
FIG. 19 is a piping system diagram showing a flow of the cooling fluid in the optical device.

FIG. 19 is a piping system diagram showing a flow of a cooling fluid in the optical device 44.

As shown in FIG. 19, this embodiment provides parallel cooling-fluid passageways for the totally nine optical elements in the optical device 44, including three liquid-crystal panels 441R, 441G, 441B, three incident-side polarizer plates 442 and three exit-side polarizer plates 443.

Specifically, the three element cooling tubes as to red light, including the liquid-crystal-panel cooling tube 4631R, the incident-side-poralizer cooling tube 4632R and the exit-side-poralizer cooling tube 4633R, have respective one ends connected to the branch tank 464 and the other ends connected to the confluent tank 465. Likewise, the three element cooling tubes 4631G, 4632G, 4633G as to green light and the three element cooling tubes 4631B, 4632B, 4633B as to blue light have respective one ends connected to the branch tank 464 and the other ends connected to the confluent tank 465. As a result, the above nine element cooling tubes are arranged parallel on the passageways of the cooling fluid between the branch tank 464 and the confluent tank 465.

The cooling fluid at the branch tank 464 is separated into three passageways per color or totally nine, to flow parallel in the nine element cooling tubes (4631R, 4632R, 4633R, 4631G, 4632G, 4633G, 4631B, 4632B, 4633B). Because the nine element cooling tubes are arranged parallel on the cooling-fluid passageways, the cooling fluids nearly the same temperature are to flow in the element cooling tubes. By flowing the cooling fluids in the element cooling tubes along the peripheral edge, the elements are cooled down while the cooling fluids flowing in the element cooling tubes rises in temperature. After this heat exchange, the cooling fluids join together in the confluent tank 465 and cooled by heat release at the radiator 466 (see FIG. 10) noted before. Then, the cooling fluid lowered in temperature is again fed to the branch tank 464.

In this embodiment, because the nine element cooling tubes corresponding to the nine optical elements are arranged parallel on the cooling-fluid passageway, the cooling-fluid passageway of from the branch tank 464 over to the confluent tank 465 is comparatively short in length, and hence the passageway resistance due to pressure loss is small over the passageway. Accordingly, even in case the element cooling tube is small in diameter, it is easy to secure the flow rate of the cooling fluid. Meanwhile, because the cooling fluid at comparatively low temperature is supplied to the elements, the elements can be cooled efficiently.

Incidentally, of the nine optical elements, the element cooling tubes may be omitted to arrange for the devices smaller in heat generation. For example, in the case the incident-side polarizer plate 442 or the exit-side polarizer plate 443 is in a form less to absorb the luminous flux, e.g. an inorganic polarizer plate, the cooling tube can be structurally omitted for same.

Meanwhile, without limited to the parallel arrangement of all the plurality of element cooling tubes on the cooling-fluid passageway, at least a part thereof may be structurally arranged in series. In this case, the passageway is preferably established in accordance with the heat generation amount on the elements.

Figure 20:
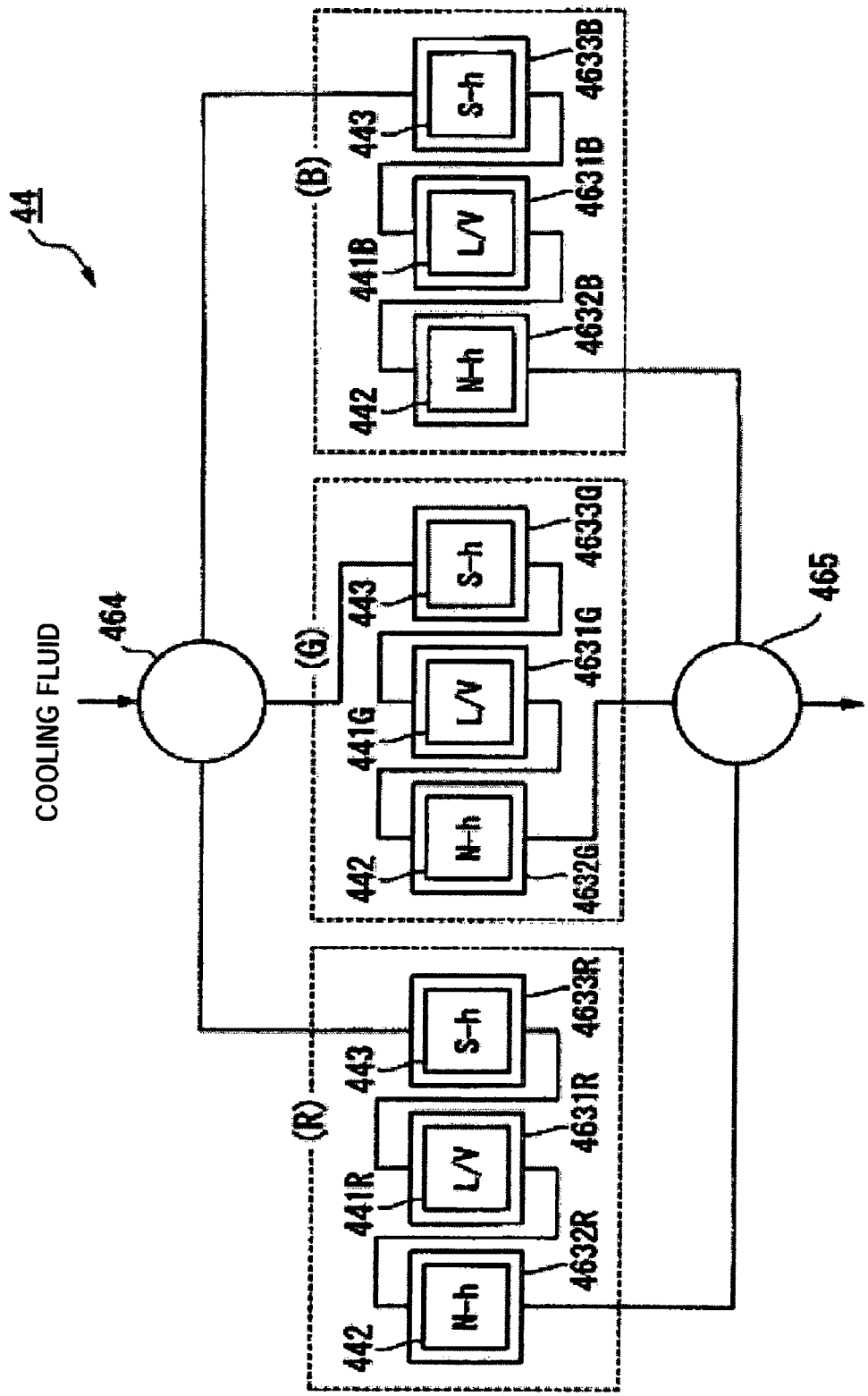
FIG. 20 is a diagram showing a modification to the piping system.

FIG. 20 shows a modification to the above piping system. Note that the structural elements common to those of FIG. 19 are attached with the same references.

In a FIG. 20 embodiment, element cooling tubes (4631R, 4632R, 4633R, 4631G, 4632G, 4633G, 4631B, 4632B, 4633B) are arranged for the totally nine optical elements of the optical device 44, including three liquid-crystal panels 441R, 441G, 441B, three incident-side polarizer plates 442 and three exit-side polarizer plates 443, respectively, wherein the cooling-fluid passageways are provided in series on a color-by-color basis.

Specifically, as for red light, connection is provided between the outlet of the branch tank 464 and the inlet of the exit-side-polarizer cooling tube 4633R, between the outlet of the exit-side-polarizer cooling tube 4633R and the inlet of the liquid-crystal-panel cooling tube 4631R, between the outlet of the liquid-crystal-panel cooling tube 4631R and the inlet of the incident-side-polarizer cooling tube 4632R, and between the outlet of the incident-side-polarizer cooling tube 4632R and the inlet of the confluent tank 465. Namely, the exit-side-polarizer cooling tube 4633R, the liquid-crystal-panel cooling tube 4631R and the incident-side-polarizer cooling tube 4632R are arranged in series in the order in the direction of from the branch tank 464 to the confluent tank 465. Likewise, as for green light, the exit-side-polarizer cooling tube 4633G, the liquid-crystal-panel cooling tube 4631G and the incident-side-polarizer cooling tube 4632G are arranged in series in the order in the direction of from the branch tank 464 to the confluent tank 465. Likewise, as for blue light, the exit-side-polarizer cooling tube 4633B, the liquid-crystal-panel cooling tube 4631B and the incident-side-polarizer cooling tube 4632B are arranged in series in the order in the direction of from the branch tank 464 to the confluent tank 465.

The cooling fluid at the branch tank 464 is separated into three passageways. As for each color, flow is firstly through the exit-side-polarizer cooling tube 4633R, 4633G, 4633B, then through the liquid-crystal-panel cooling tube 4631R, 4631G, 4631B and finally through the incident-side-polarizer cooling tube 4632R, 4632G, 4632B. By flowing the cooling fluid in the element cooling tubes along the peripheral edges of the elements, the elements are cooled and the cooling fluid flowing through the element cooling tube rises in temperature. In this embodiment, because three element cooling tubes are arranged in series for each color, the inflow temperature of the cooling fluid (inlet temperature) is the lowest at the upstream exit-side polarizer cooling tube 4633R, 4633G, 4633B, next lowest at the liquid-crystal-panel cooling tube 4631R, 4631G, 4631B and comparatively high at the downstream incident-side polarizer cooling tube 4632R, 4632G, 4632B. Then, the cooling fluids join together in the confluent tank 465 and cooled by heat release at the radiator 466 (see FIG. 10) noted before. Then, the cooling fluid lowered in temperature is again fed to the branch tank 464.

Here, in the liquid-crystal panel 441R, 441G, 441B, the luminous flux is partly absorbed due to light absorption by the liquid-crystal layer as well as by the data and scanning lines formed on the drive substrate and the black matrix formed on the counter substrate. Meanwhile, at the incident-side polarizer plate 442, the incident luminous flux is nearly one sort of polarization light converted by the upstream polarization conversion element 414 (see FIG. 8) so that the major part of the relevant luminous flux transmits through it with comparatively less absorption of the luminous flux. Meanwhile, at the exit-side polarizer plate 443, the incident luminous flux is a modulation in polarization based upon image information wherein the absorption amount of the luminous flux usually is greater than that by the incident-side polarizer plate 442.

The heat generation on the optical device 44 tends to be higher in the order of at the incident-side polarizer plate, at the liquid-crystal panel and at the exit-side polarizer plate (incident-side polarizer plate<liquid-crystal panel<exit-side polarizer plate).

In the FIG. 20 embodiment, because three element cooling tubes per color are arranged series on the cooling-fluid passageway, piping space can be reduced as compared to the structure the nine element cooling tubes are all in a parallel arrangement.

Meanwhile, the exit-side polarizer plate 443 is positively cooled because the cooling fluid is first supplied to the exit-side polarizer plate 443 comparatively high in heat generation amount.

Incidentally, the above embodiment arranged the element cooling tubes in series in the order, from the upstream, of higher heat generation amount, which however is not limitative. The element cooling tubes may be arranged in series in the order, from the upstream, of lower heat generation amount, or in another order. The order of arrangement is established according to the difference in heat generation amount between a plurality of elements, the cooling capacity of the element cooling tube or the like.

Furthermore, without limited to the arrangement all in series of a plurality of element cooling tubes on a color-by-color basis, part of those may be arranged in series as described in the following.

Figure 21:
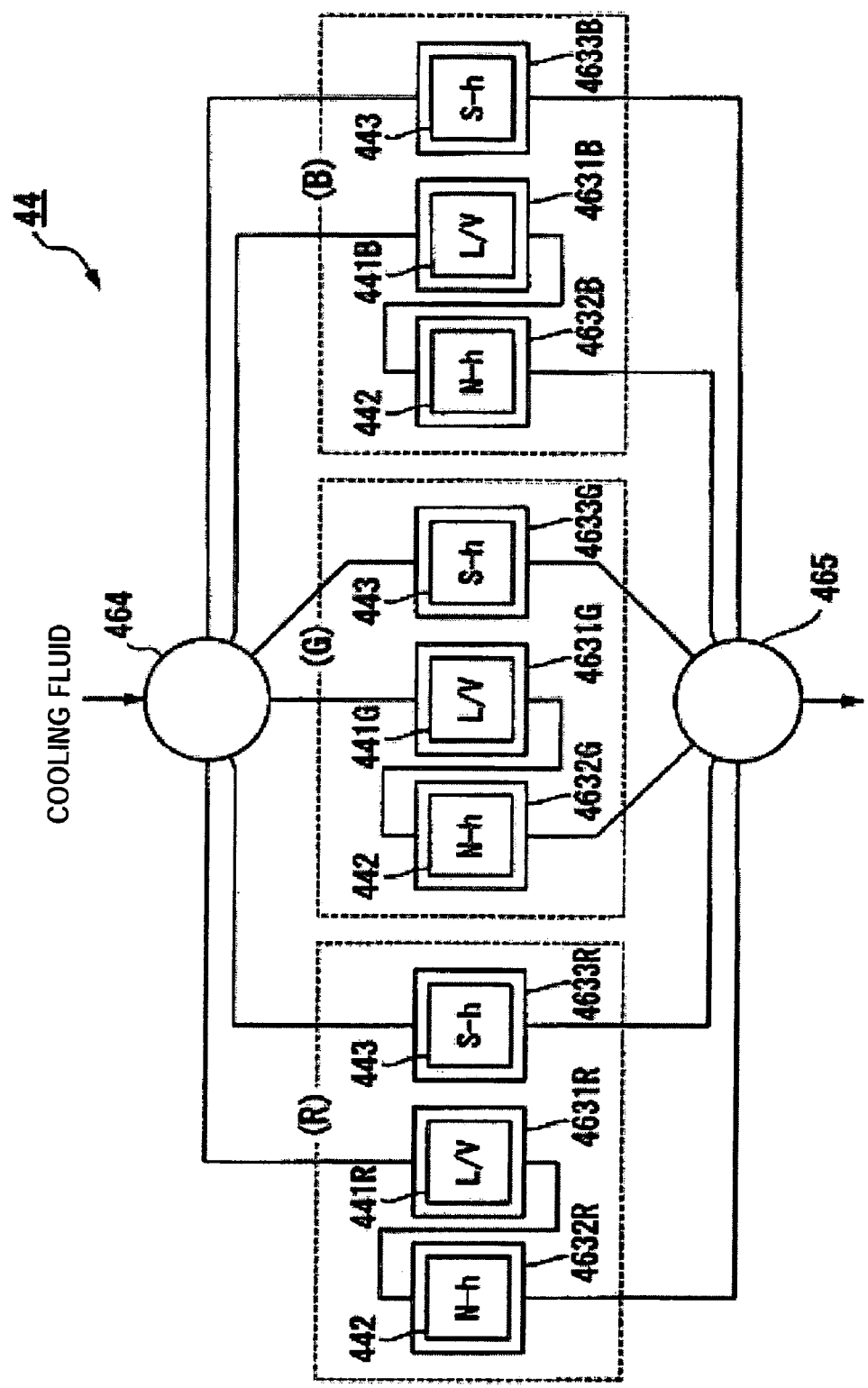
FIG. 21 is a diagram showing another modification to the piping system.

FIG. 21 shows another modification to the piping system. Note that the structural elements common to those of FIG. 21 are attached with the same references.

In a FIG. 21 embodiment, element cooling tubes (4631R, 4632R, 4633R, 4631G, 4632G, 4633G, 4631B, 4632B, 4633B) are arranged for the totally nine optical elements of the optical device 44, including three liquid-crystal panels 441R, 441G, 441B, three incident-side polarizer plates 442 and three exit-side polarizer plates 443, respectively, wherein the cooling-fluid passageways are provided partly in series for each color.

Specifically, as for red light, the liquid-crystal-panel cooling tube 4631R and the incident-side-polarizer cooling tube 4632R are arranged in series in the order in a direction of from the branch tank 464 to the confluent tank 465. In parallel therewith, the exit-side-polarizer cooling tube 4633R is arranged. Namely, connection is provided between the outlet of the branch tank 464 and the inlet of the liquid-crystal-panel cooling tube 4631R, between the outlet of the liquid-crystal-panel cooling tube 4631R and the inlet of the incident-side-polarizer cooling tube 4632R, between the outlet of the incident-side-polarizer cooling tube 4632R and the inlet of the confluent tank 465. Meanwhile, connection is provided between the outlet of the confluent tank 464 and the inlet of the exit-side-polarizer cooling tube 4633R and between the outlet of the exit-side-polarizer cooling tube 4633R and the inlet of the confluent tank 465. Likewise, as for green light, the liquid-crystal-panel cooling tube 4631G and the incident-side-polarizer cooling tube 4632G are arranged in series in the order in the direction of from the branch tank 464 to the confluent tank 465. In parallel therewith, the exit-side-polarizer cooling tube 4633G is arranged. Likewise, as for blue light, the liquid-crystal-panel cooling tube 4631B and the incident-side-polarizer cooling tube 4632B are arranged in series. In parallel therewith, the exit-side-polarizer cooling tube 4633G is arranged.

The cooling fluid at the branch tank 464 is separated into two passageways per color, totally six passageways. The cooling fluid for each color firstly enters the liquid-crystal-panel cooling tube 4631R, 4631G, 4631B and the exit-side-polarizer cooling tube 4633R, 4633G, 4633B. The cooling fluid, flowed the liquid-crystal-panel cooling tube 4631R, 4631B, then flows the incident-side-polarizer cooling tube 4632R, 4632G, 4632B, then flowing toward the confluent tank 465. Meanwhile, the cooling fluid for each color, flowed the exit-side-polarizer cooling tube 4633R, 4633G, 4633B, then flows toward the confluent tank 465 directly from the exit-side-polarizer cooling tube 4633R, 4633G, 4633B. By flowing the cooling fluid in the element cooling tubes along the peripheral edges of the elements, the elements are cooled down while the cooling fluid flowing the element cooling tubes rise in temperature. In this embodiment, the inflow temperature of the cooling fluid (inlet temperature) is comparatively low at the upstream liquid-crystal-panel cooling tube 4631R, 4631G, 4631B and exit-side polarizer cooling tube 4633R, 4633G, 4633B but comparatively high at the incident-side polarizer cooling tube 4632R, 4632G, 4632B. Meanwhile, because the heat generation is the highest on the exit-side polarizer cooling tube 4633R, 4633G, 4633B as compared to the other elements, the outflow temperature of the cooling fluid (outlet temperature) is comparatively high at the exit-side polarizer cooling tube 4633R, 4633G, 4633B. As compared to it, the outlet temperature is comparatively low at the liquid-crystal-panel cooling tube 4631R, 4631G, 4631B. Consequently, in the FIG. 21 embodiment, the incident-side polarizer cooling tube 4632R, 4632G, 4632B has an inlet temperature lower as compared to that in the foregoing FIG. 20 embodiment. The cooling fluids, flowed the element peripheral edges, then join together in the confluent tank 465 and cooled by heat release at the radiator 466 (see FIG. 10) noted before. Then, the cooling fluids whose temperature is lowered are supplied again to the branch tank 464.

In the FIG. 21 embodiment, because two element cooling tubes per color are arranged series while another element cooling tube is arranged in parallel therewith, piping space can be reduced as compared to the structure the nine element cooling tubes are all in a parallel arrangement.

Meanwhile, because cooling passageways are provided for the liquid-crystal panels 441R, 441G, 441B and incident-side polarizer plate 442 in parallel with the cooling passageways for the exit-side polarizer plate 443 high in heat generation, it is possible to avoid the heat influence of the exit-side polarizer plate 443 upon other elements. Thus, the liquid-crystal panels 441R, 441G, 441B and incident-side polarizer plates 442 are cooled effectively.

Incidentally, the cooling structure is of the same for the three colors of red (R), green (G) and blue (B) in the embodiments in FIGS. 19, 20 and 21, the structure may be different from color to color. For example, the FIG. 20 or 21 structure may be employed for red light and blue light while the FIG. 19 or 21 structure be employed for green light. Besides, other combinations may be applied.

Here, because green light is generally comparatively high in light intensity, the optical device for same is readily rise in temperature. Accordingly, by employing a cooling structure having a high cooling effect for green light and a simple cooling structure for red light and blue light, it is possible to reduce the piping space and improve the element cooling efficiency.

Meanwhile, in the FIGS. 19, 20 and 21 embodiment, the branch tank 464 branched the cooling-fluid passageway into at least three correspondingly to the three colors of red, green and blue, which however is not limitative. For example, the branch tank 464 may be structured to branch the cooling-fluid passageway as a system related to red and blue light and as a system related to green light. In this case, by arranging the cooling structures related to red and blue light in series and a cooling structure related to green light in parallel therewith, piping space reduction and device cooling efficiency improvement can be achieved.

Although the foregoing embodiments described on the projector example using three liquid-crystal panels, the invention is also applicable to a projector using only one liquid-crystal panel, a projector using only two liquid-crystal panels or a projector using four or more liquid-crystal panels.

Meanwhile, without limited to the transmission liquid-crystal panel, a reflective liquid-crystal panel may be used.

Meanwhile, the light modulation element may use such a light modulation element of other than liquid crystal as a device using a micro-mirror without limited to the liquid-crystal panel. In this case, the luminous-flux incident-side and exit-side polarizer plates can be omitted.

Meanwhile, the invention is applicable to a front-type projector that projection is allowed in a direction observing the screen and a rear-type projector that projection is allowed in a direction opposite to observing the screen.

Although the preferred embodiments of the invention were described while referring to the drawings, the invention is naturally not to be limited to those examples. The person skilled in the art would apparently reach various alterations or modifications in the range of the technical idea set forth in the claims, which are to be naturally construed belonging to the technical scope of the invention.

The entire disclosure of Japanese Patent Application No: 2005-055630, filed Mar. 1, 2005 is expressly incorporated by reference herein.

What is claimed is:

1. A method of manufacturing a cooling unit, the cooling unit including a cooling plate in which a cooling fluid is allowed to flow, the cooling plate having a pair of plate members oppositely arranged to sandwich a cooling tube in which the cooling fluid is to flow, the method comprising:
    forming a groove for receiving the cooling tube, in at least one opposing surface of a plate member of the pair of plate members;
    forming at least one projection at a point adjacent to the groove, the projection protruding toward the groove;
    joining each of the plate members of the pair and the cooling tube together by receiving the cooling tube in the groove;
    in joining, an external force being applied to at least one plate member of the pair, whereby deformation is caused in the at least one projection, the deformed projection being directly engaged with an outer surface of the cooling tube;
    forming a light source device;
    forming an optical device including a light modulation element for modulating a luminous flux emitted from a light source according to image information and forming an optical image,
    the light modulation element being held in the cooling unit; and
    forming a projection optical device for projecting, with magnification, an optical image formed by the optical device.

2. The method of manufacturing a cooling unit according to claim 1,
    the groove being formed by use of casting or forging.

3. The method of manufacturing a cooling unit according to claim 1,
    the groove and the cooling tube having contours substantially equal in size.

4. The method of manufacturing a cooling unit according to claim 1, further comprising:
    forming a concave portion adjacent to the groove in the at least one opposing surface of the plate members while,
    in joining, a bank formed between the groove and the concave portion is caused to deform and engage with the cooling tube.

5. The method of manufacturing a cooling unit according to claim 4, further comprising:
    forming a convex portion to be inserted in the concave portion of an opposing plate member while,
    in joining, mating is provided between the concave portion in one plate member and the convex portion in the opposing plate member thereby causing a deformation in the bank.

6. The method of manufacturing a cooling unit according to claim 1,
    in joining, the groove being partially deformed by inserting a predetermined object in at least one plate member of the pair.

7. The method of manufacturing a cooling unit according to claim 6,
    the predetermined object being engaged with the cooling tube.

8. The method of manufacturing a cooling unit according to claim 1, further comprising:
    filling a heat conductive material in a gap between the groove and the cooling tube.

9. The method of manufacturing a cooling unit according to claim 8,
    the heat conductive material including at least one of a resin material mixed with a metal material, a resin material mixed with a carbon material, and a hot melt.

10. The method of manufacturing a cooling unit according to claim 8,
    the heat conductive material having elasticity in a temperature range for using the cooling plate.

11. The method of manufacturing a projector according to claim 1,
    the groove being formed by use of casting or forging.

12. The method of forming a projector according to claim 1,
    the groove and the cooling tube having contours substantially equal in size.

13. The method of manufacturing a projector according to claim 1, further comprising:
    forming a concave portion adjacent to the groove in the at least one opposing surface of the plate members while,
    in joining, a bank formed between the groove and the concave portion is caused to deform and engage with the cooling tube.

14. The method of manufacturing a projector according to claim 13, further comprising:
    forming a convex portion to be inserted in the concave portion of an opposing plate member while,
    in joining, mating is provided between the concave in one plate member and the convex in the opposing plate member thereby causing a deformation in the bank.

15. The method of manufacturing a projector according to claim 1, wherein
    in joining each plate member of the pair, the groove being partially deformed by inserting a predetermined object in at least one plate member of the pair.

16. The method of manufacturing a projector according to claim 15,
    the predetermined object being engaged with the cooling tube.

17. The method of manufacturing a projector according to claim 1, further comprising:
    filling a heat conductive material in a gap between the groove and the cooling tube.

18. The method of manufacturing a projector according to claim 17, the heat conductive material including at least one of a resin material mixed with a metal material, a resin material mixed with a carbon material, and a hot melt.

19. The method of manufacturing a projector according to claim 17, the heat conductive material having elasticity in a temperature range for using the cooling plate.

* * * * *